(12) United States Patent
Holcomb et al.

(10) Patent No.: US 8,578,844 B2
(45) Date of Patent: Nov. 12, 2013

(54) FOOD PROCESSING SYSTEM

(75) Inventors: David A. Holcomb, Seattle, WA (US);
Adam A. Jossem, Seattle, WA (US)

(73) Assignee: Chef'n Corporation, Seattle, WA (US)

( * ) Notice: Subject to any disclaimer, the term of this patent is extended or adjusted under 35 U.S.C. 154(b) by 1392 days.

(21) Appl. No.: 12/005,163

(22) Filed: Dec. 21, 2007

(65) Prior Publication Data

US 2008/0223226 A1 Sep. 18, 2008

Related U.S. Application Data

(60) Provisional application No. 60/876,694, filed on Dec. 21, 2006, provisional application No. 60/934,221, filed on Jun. 11, 2007.

(51) Int. Cl.
*A23N 1/02* (2006.01)
*A47J 42/04* (2006.01)
*A47J 42/46* (2006.01)
*A47J 43/08* (2006.01)

(52) U.S. Cl.
CPC *A47J 42/04* (2013.01); *A47J 42/46* (2013.01); *A47J 43/082* (2013.01)
USPC .................................. 99/510; 99/495; 241/92

(58) Field of Classification Search
USPC ........... 99/628, 540, 584, 623, 629, 634, 588, 99/510; 241/101.1, 282.1, 282.2, 199.12, 241/169.1
See application file for complete search history.

(56) References Cited

U.S. PATENT DOCUMENTS

| | | | |
|---|---|---|---|
| 507,903 | A | 10/1893 | Hancock |
| 1,194,318 | A | 8/1916 | Power |
| D53,588 | S | 7/1919 | Grasberger |
| 1,511,287 | A | 10/1924 | Lindley |
| 1,619,550 | A | 3/1927 | Thebaud et al. |
| D77,900 | S | 3/1929 | Lawson |
| 1,723,507 | A | 8/1929 | Haertter |
| 1,856,769 | A | 5/1932 | Latshaw |
| 2,246,054 | A | 6/1941 | Marty |

(Continued)

FOREIGN PATENT DOCUMENTS

| | | |
|---|---|---|
| EP | 0176450 A1 | 4/1986 |
| EP | 1400196 A2 | 3/2004 |

(Continued)

OTHER PUBLICATIONS

Dalla Piazza et al., "Pivotally-Leveraged Manual Centrifugal Drive," Preliminary Amendment Jul. 13, 2010, for U.S. Appl. No. 12/069,374, 74 pages.

*Primary Examiner* — Henry Yuen
*Assistant Examiner* — Thien S Tran
(74) *Attorney, Agent, or Firm* — Seed IP Law Group PLLC

(57) ABSTRACT

Apparatuses, systems, and methods for processing system foodstuff are shown and described. Food processing systems can hold and prepare food for consumption. The disclosed embodiments provide a drive mechanism that utilizes a contoured surface between a ratchet wheel and a drive mechanism that rotates the ratchet wheel to move the ratchet wheel toward and in engagement with a drive wheel for initiating rotation of the drive wheel and to disengage the ratchet wheel from the drive wheel to allow the drive wheel to rotate freely. The drive wheel is configured to couple to a processing component of the processing system.

16 Claims, 35 Drawing Sheets

(56) References Cited

U.S. PATENT DOCUMENTS

| | | |
|---|---|---|
| 2,347,383 A | 4/1944 | Wiegratz |
| 2,407,819 A | 9/1946 | Dolan, II |
| 2,432,299 A | 12/1947 | Eggleston |
| 2,592,481 A | 4/1952 | Spencer et al. |
| D174,607 S | 5/1955 | Anderson |
| 2,791,026 A | 5/1957 | Byrd |
| 2,796,987 A | 6/1957 | Meyer |
| D181,796 S | 12/1957 | Jones |
| D183,384 S | 8/1958 | de Mille |
| 2,901,762 A | 9/1959 | Bell |
| 2,964,773 A | 12/1960 | Pence |
| 3,123,114 A | 3/1964 | Andrews et al. |
| 3,139,917 A | 7/1964 | Elmore |
| D198,982 S | 8/1964 | Marcus |
| 3,156,278 A | 11/1964 | Otto |
| D207,114 S | 3/1967 | Latham |
| 3,581,790 A | 6/1971 | Conte |
| 3,729,096 A | 4/1973 | Fitzner et al. |
| 3,795,062 A | 3/1974 | Lamb |
| 3,804,450 A | 4/1974 | Guenzel |
| 3,885,321 A | 5/1975 | Fouineteau ............. 34/58 |
| 3,906,632 A | 9/1975 | Oppenheimer |
| 3,990,358 A | 11/1976 | Cade |
| 4,007,751 A | 2/1977 | Commiant |
| 4,088,360 A | 5/1978 | Jenkins et al. |
| 4,101,978 A | 7/1978 | Brackman |
| D249,772 S | 10/1978 | Amiot |
| 4,124,310 A | 11/1978 | Brackman et al. |
| D254,935 S | 5/1980 | Staudinger |
| 4,209,916 A | 7/1980 | Doyel ................. 34/58 |
| 4,264,215 A | 4/1981 | Nunlist et al. |
| D265,601 S | 7/1982 | Olsson |
| 4,350,445 A | 9/1982 | Olsson |
| 4,374,574 A * | 2/1983 | David ............. 241/169.1 |
| D269,060 S | 5/1983 | Creamer |
| 4,386,740 A | 6/1983 | Van Deursen |
| 4,425,711 A | 1/1984 | Wood et al. |
| D272,661 S | 2/1984 | Cutler |
| 4,442,764 A | 4/1984 | Bos et al. |
| 4,480,605 A * | 11/1984 | Bloemers ............. 123/185.3 |
| D278,201 S | 4/1985 | Koepke |
| 4,524,514 A | 6/1985 | Mallalieu et al. |
| D283,668 S | 5/1986 | Dilot |
| D288,893 S | 3/1987 | Epstein |
| 4,682,740 A | 7/1987 | Conigliaro et al. |
| 4,768,429 A | 9/1988 | Federighi |
| D298,721 S | 11/1988 | Rea, Sr. |
| D300,000 S | 2/1989 | Reinhardt |
| 4,905,465 A | 3/1990 | Jones et al. |
| D307,331 S | 4/1990 | Pflieger |
| 4,937,942 A | 7/1990 | Skerker et al. |
| 4,969,268 A | 11/1990 | Kelly, III |
| D315,657 S | 3/1991 | Ruttimann |
| 5,014,434 A | 5/1991 | Skerker et al. |
| 5,064,535 A | 11/1991 | Hsu ............. 210/380.1 |
| 5,082,190 A | 1/1992 | Chen |
| D326,033 S | 5/1992 | Friederichs |
| D326,034 S | 5/1992 | Kluesner |
| D331,686 S | 12/1992 | Persson |
| 5,176,418 A | 1/1993 | Niu |
| 5,245,726 A | 9/1993 | Rote et al. |
| D342,872 S | 1/1994 | Kanerva |
| 5,307,738 A | 5/1994 | Amstad |
| 5,360,170 A | 11/1994 | Cartellone |
| 5,401,159 A | 3/1995 | Hsu |
| D360,561 S | 7/1995 | Littledeer |
| 5,435,237 A | 7/1995 | Huang |
| D363,004 S | 10/1995 | Popek |
| D363,861 S | 11/1995 | Slater |
| 5,491,869 A | 2/1996 | Sullivan et al. |
| 5,562,025 A | 10/1996 | Bull et al. ............. 99/495 |
| 5,562,256 A | 10/1996 | Wolman et al. |
| D375,353 S | 11/1996 | Wolff |
| D376,049 S | 12/1996 | Harris et al. |
| 5,617,783 A | 4/1997 | Beeler |
| D387,629 S | 12/1997 | Thierry |
| D388,286 S | 12/1997 | Fox |
| 5,735,193 A | 4/1998 | Chang |
| D395,789 S | 7/1998 | Dodane |
| 5,782,416 A | 7/1998 | Nejatbina |
| D396,613 S | 8/1998 | Cousins |
| D396,992 S | 8/1998 | Lallemand |
| 5,823,672 A | 10/1998 | Barker |
| 5,839,826 A | 11/1998 | Eubanks |
| 5,842,651 A | 12/1998 | Smothers |
| 5,865,109 A | 2/1999 | Bull ............. 99/495 |
| 5,904,090 A | 5/1999 | Lillelund et al. ............. 99/495 |
| 5,960,709 A | 10/1999 | Yip |
| 5,996,483 A | 12/1999 | Yip |
| 6,000,650 A | 12/1999 | Penaranda et al. |
| 6,012,750 A | 1/2000 | Swartz |
| 6,018,883 A | 2/2000 | Mulhauser |
| 6,035,771 A | 3/2000 | Conran et al. |
| D422,858 S | 4/2000 | Moore |
| D423,712 S | 4/2000 | Aoki et al. |
| D432,876 S | 10/2000 | Kwok |
| D434,597 S | 12/2000 | Yip |
| D443,186 S | 6/2001 | Kaposi |
| D443,801 S | 6/2001 | Short |
| D447,912 S | 9/2001 | Veltri et al. |
| D458,090 S | 6/2002 | Veltri et al. |
| D464,536 S | 10/2002 | Veltri et al. |
| D469,322 S | 1/2003 | Jørgensen |
| 6,510,785 B1 | 1/2003 | Margolin |
| D477,754 S | 7/2003 | Holcomb et al. |
| D481,912 S | 11/2003 | Jørgensen |
| D484,424 S | 12/2003 | Jørgensen |
| D487,556 S | 3/2004 | Siegel et al. |
| D487,942 S | 3/2004 | Hiroi |
| D488,394 S | 4/2004 | Overthun et al. |
| D491,419 S | 6/2004 | White et al. |
| D496,230 S | 9/2004 | Germany |
| D496,231 S | 9/2004 | Germany |
| D498,989 S | 11/2004 | White et al. |
| 6,938,523 B1 | 9/2005 | Farrey |
| D514,403 S | 2/2006 | Wolf |
| D516,392 S | 3/2006 | de Vries |
| D521,244 S | 5/2006 | Germany |
| D541,599 S | 5/2007 | Quattromani |
| D575,101 S | 8/2008 | Germany |
| D576,836 S | 9/2008 | Jossem et al. |
| D585,709 S | 2/2009 | Peterson et al. |
| D587,537 S | 3/2009 | Vendl et al. |
| D592,019 S | 5/2009 | Holcomb et al. |
| D601,299 S | 9/2009 | Germany et al. |
| D604,125 S | 11/2009 | Griffith |
| D609,981 S | 2/2010 | Jossem et al. |
| 7,681,495 B2 | 3/2010 | Wan et al. |
| D616,713 S | 6/2010 | Jossem |
| D620,768 S | 8/2010 | Jossem |
| D628,448 S | 12/2010 | Genatossio |
| D631,711 S | 2/2011 | Jossem et al. |
| D632,142 S | 2/2011 | Lu |
| 7,921,769 B2 | 4/2011 | So et al. |
| 7,975,948 B2 | 7/2011 | Holcomb et al. |
| D648,602 S | 11/2011 | Gray |
| 2002/0093210 A1 | 7/2002 | Sassone et al. |
| 2002/0153440 A1* | 10/2002 | Holcomb et al. ............. 241/169.1 |
| 2004/0069881 A1 | 4/2004 | Arduini ............. 241/169.1 |
| 2004/0231087 A1 | 11/2004 | Siegel et al. |
| 2005/0023389 A1 | 2/2005 | Wu |
| 2005/0166406 A1 | 8/2005 | Cornfield |
| 2006/0144257 A1 | 7/2006 | Cheng et al. |
| 2006/0207441 A1 | 9/2006 | Mulhauser et al. ............. 99/495 |
| 2008/0223226 A1 | 9/2008 | Holcomb et al. |
| 2008/0256807 A1 | 10/2008 | Kirkup |
| 2008/0277513 A1 | 11/2008 | Holcomb et al. |
| 2008/0301952 A1 | 12/2008 | Holcomb et al. |
| 2009/0114104 A1 | 5/2009 | Sawhney et al. |

FOREIGN PATENT DOCUMENTS

| | | |
|---|---|---|
| FR | 1012262 | 7/1952 |
| FR | 2 642 294 | 8/1990 |

(56) References Cited

FOREIGN PATENT DOCUMENTS

| | | |
|---|---|---|
| FR | 2682026 A1 | 4/1993 |
| FR | 2713069 A1 | 6/1995 |
| GB | 2355946 A | 5/2001 |
| JP | 5726670 | 6/1982 |
| JP | 62100989 A | 5/1987 |
| JP | 02046276 A | 2/1990 |
| JP | 3022041 U | 12/1995 |
| JP | 10174647 A | 6/1998 |
| JP | 2000107047 A | 4/2000 |
| WO | 02085168 A1 | 10/2002 |
| WO | 2005115209 A1 | 12/2005 |
| WO | 2008096319 A1 | 8/2008 |

\* cited by examiner 008,578,844 B2

FOOD PROCESSING SYSTEM

CROSS-REFERENCES TO RELATED APPLICATIONS

This application claims the benefit under 35 U.S.C. §119(e) of U.S. Provisional Patent Application No. 60/876,694 filed Dec. 21, 2006 and U.S. Provisional Patent Application No. 60/934,221 filed Jun. 11, 2007, where these two provisional applications are incorporated herein by reference in their entireties.

BACKGROUND OF THE INVENTION

1. Field of the Invention

The present disclosure in some embodiments generally relates to processing systems, and more specifically to food processing systems.

2. Description of the Related Art

Food preparation devices often have movable internal components used to process food. Salad spinners, for example, have a rotatable inner basket nested in an outer bowl. Salad ingredients are placed in the inner basket, and a removable cover is used to cover both the filled inner basket and the outer bowl. The inner basket is then rotated relative to the outer bowl to drive water on the salad ingredients through holes in the inner basket. The water is then collected in the outer bowl. Salad spinners often have a movable handle that rotates about an axis of rotation that is collinear with the axis about which the inner basket rotates. Rotation of the handle causes rotation of the inner basket. Other types of salad spinners have a linearly reciprocating handle used to drive the rotatable inner basket. A drive assembly of such salad spinner converts the linear reciprocating movement of the handle to rotary motion of the inner basket.

Spice grinders, such as pepper grinders, often have a grinding mechanism driven by a rotatable handle. Similar to salad spinners, the handle rotates about an axis of rotation that is parallel to an axis of rotation of a rotatable grinding element of the grinding mechanism. To grind pepper, the user grips a main body of the pepper grinder and rotates the handle relative to the main body. The handle drives the grinding element, which in turn grinds peppercorns. The ground pepper then falls out of the pepper grinder for subsequent consumption.

BRIEF SUMMARY

In some embodiments, a food processing system comprises a main body defining a chamber, an actuatable lever pivotally coupled to the main body, and a tool disposed within the main body. The actuatable lever is pivotable relative to the main body about a lever axis of rotation between an open position and a closed position. The tool is rotatable relative to the main body about a tool axis of rotation. The tool axis of rotation is non-parallel with the lever axis of rotation. In some embodiments, the processing system also includes a drive system connecting the actuatable lever to the tool such that the tool is rotated about the tool axis of rotation in response to the actuatable lever pivoting between the open position and the closed position.

In other embodiments, a food processing system comprises a container assembly including a main body, a cover removably coupleable to the main body, and a holding chamber defined at least in part by the main body and the cover. The cover has a bracket that defines a first axis of rotation spaced from the chamber. A lever system is coupled to the cover. The lever system is pivotable about the first axis of rotation between an open position and a closed position. A drive system extends between the lever system and the main body. At least a portion of the main body is rotatable about a second axis of rotation when the lever system is pivoted between the open position and the closed position.

In yet other embodiments, a drive system is configured to impart rotational motion to a processing component of a food processing system and facilitate free rotation thereof, the food processing system having a chamber for holding a food item to be processed. The drive system includes an actuator coupled to a drive shaft extending along a first axis and configured to be coupled to the processing component, and an engagement/disengagement mechanism coupling the actuator to the drive shaft and configured to engage the drive shaft upon actuation to impart rotational motion to the drive shaft, and to disengage from the drive shaft following actuation to facilitate free rotation of the drive shaft.

In one embodiment, the engagement/disengagement mechanism includes a drive mechanism configured to be rotatably mounted with respect to the chamber and having at least one protrusion, the drive mechanism rotating in response to actuation of the actuator. Furthermore, the engagement/disengagement mechanism includes a ratchet wheel adjacent the drive mechanism and being moveable along the first axis between an engaged position and a disengaged position, and having a first surface and a second surface, opposed to the first surface, the first surface having a variable contour including a first end and a second end, and the second surface having a plurality of circumferentially spaced teeth.

In an aspect, the engagement/disengagement mechanism further has a drive wheel coupled to the drive shaft and having a plurality of circumferentially driven teeth wherein, before relative rotation of the drive mechanism the ratchet wheel is in the disengaged position in which the protrusion is positioned toward the first end of the variable contour and the ratchet wheel is spaced from the drive wheel, upon relative rotation of the drive mechanism the protrusion traveling along the variable contour toward the second end, an interaction between the protrusion and the variable contour rotating the ratchet wheel and moving the ratchet wheel toward the engaged position to facilitate engagement of the plurality of teeth to the plurality of driven teeth, respectively, to rotate the drive wheel and drive shaft, the drive mechanism ceasing relative rotation when the protrusion approximately reaches the second end, allowing the rotating ratchet wheel to rotate with respect thereto and the ratchet wheel to return to the disengaged position, facilitating disengagement of the plurality of teeth from the plurality of driven teeth, the drive wheel and the drive shaft rotating freely upon the disengagement.

In yet another embodiment, a food processing system is provided, which includes the drive mechanism having an engagement/disengagement mechanism.

According to still another embodiment, a drive system configured to impart rotational motion to a processing component of a food processing system and facilitate free rotation thereof, the food processing system having a chamber for holding a food item to be processed. The drive system includes an actuator coupled to a drive shaft extending along a first axis and configured to be coupled to the processing component, and an engagement/disengagement mechanism coupling the actuator to the drive shaft and configured to engage the drive shaft upon actuation to impart rotational motion to the drive shaft, and to disengage from the drive shaft following actuation to facilitate free rotation of the drive shaft.

In one embodiment, the engagement/disengagement mechanism includes a drive mechanism rotatably mounted with respect to the chamber and having at least one structural feature, a ratchet wheel being moveable in a direction substantially parallel to the first axis between an engaged position and a disengaged position, and having a first surface and a second surface, opposed to the first surface, the first surface having a variable contour including a first end and a second end, and the second surface having a plurality of circumferentially spaced teeth.

In an aspect, the engagement/disengagement mechanism further includes a drive wheel coupled to the drive shaft and having a plurality of circumferentially driven teeth wherein, an interaction between the contoured surface of the ratchet wheel and the structural feature of the drive mechanism rotates the ratchet wheel and moves the ratchet wheel toward the engaged position to facilitate engaging the plurality of teeth to the plurality of driven teeth to impart rotational motion to the drive wheel, the contoured surface having a stop member configured to confront the structural feature, ceasing relative rotation of the drive mechanism while the ratchet wheel continues to rotate, to move the ratchet wheel to the disengaged position, allowing the drive wheel to rotate freely.

DETAILED DESCRIPTION OF THE INVENTION

The present detailed description is generally directed to a system for processing foodstuff. Many specific details of certain example embodiments and designs are set forth in the following description and in FIGS. 1-27 to provide a thorough understanding of such embodiments. One skilled in the art, however, will understand that the disclosed embodiments may be practiced without one or more of the details described in the following description. Additionally, the processing systems are discussed in the context of preparing foodstuff because they have particular utility in this context. For example, the processing systems are particularly well suited for drying, grinding, dispensing, milling, crushing, metering, or otherwise processing or delivering consumable products.

It should be noted that, as used in this specification and the appended claims, the singular forms "a," "an," and "the" include plural referents unless the context clearly dictates otherwise. For example, a lever may include a single lever or a plurality of levers. It should also be noted that the term "or" is generally employed in its sense including "and/or" unless the content clearly dictates otherwise.

Figure 1:
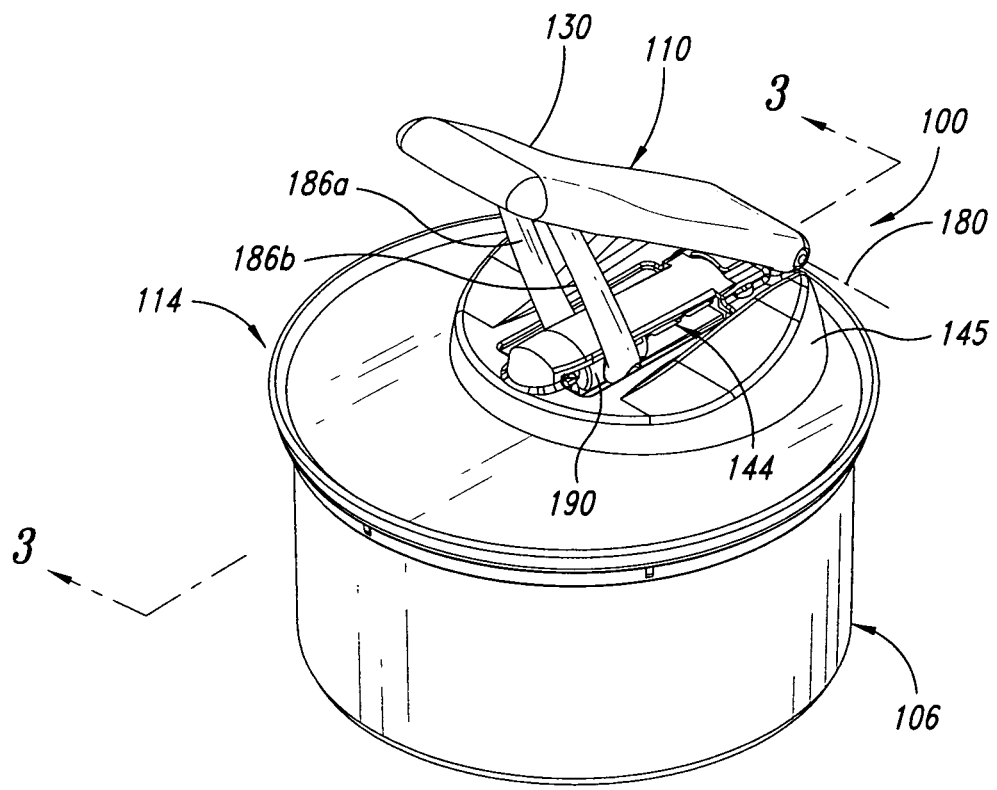
FIG. 1 is a perspective view of a processing system, in accordance with one illustrated embodiment.
Figure 2:
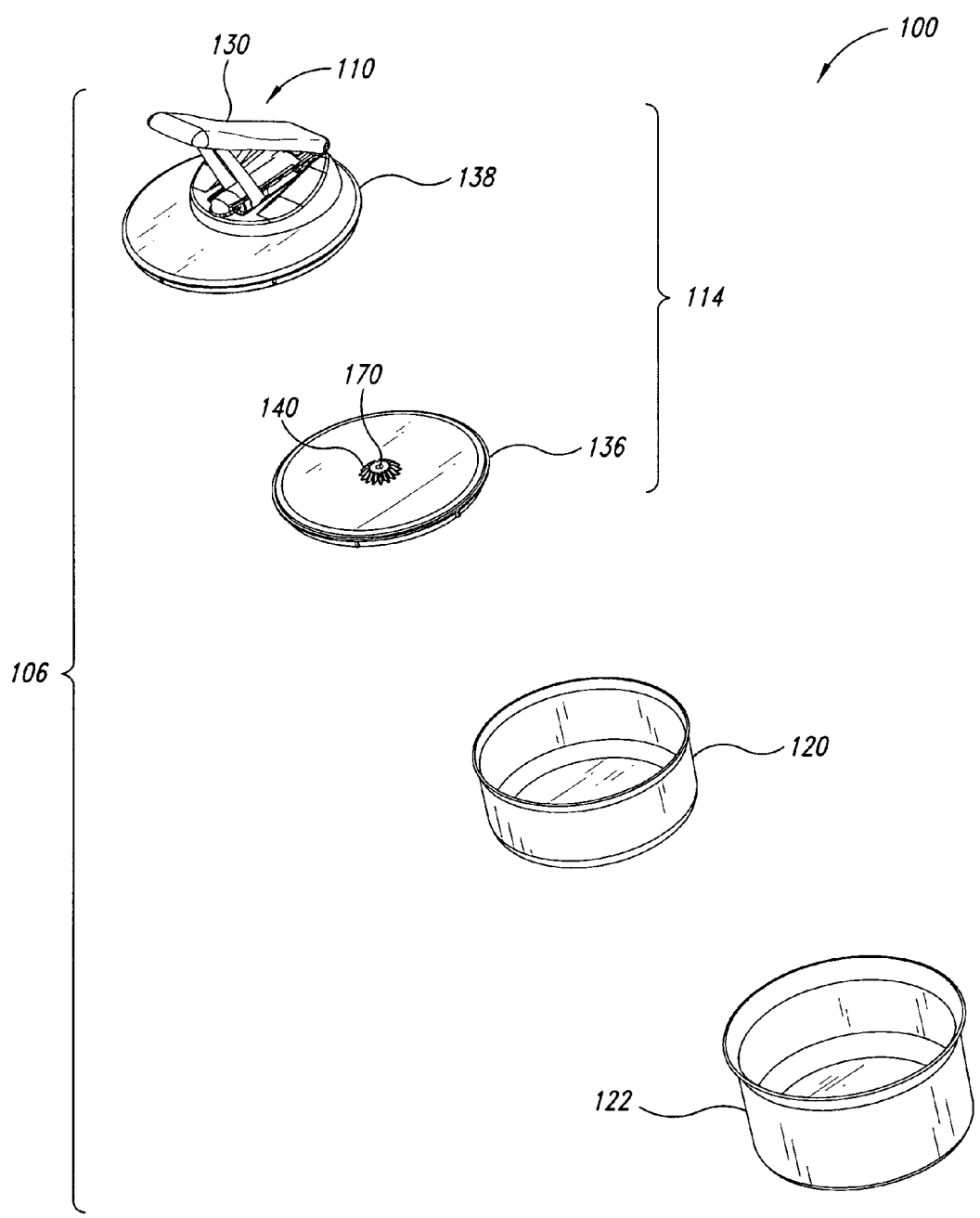
FIG. 2 is an exploded perspective view of the processing system of FIG. 1.
Figure 3:
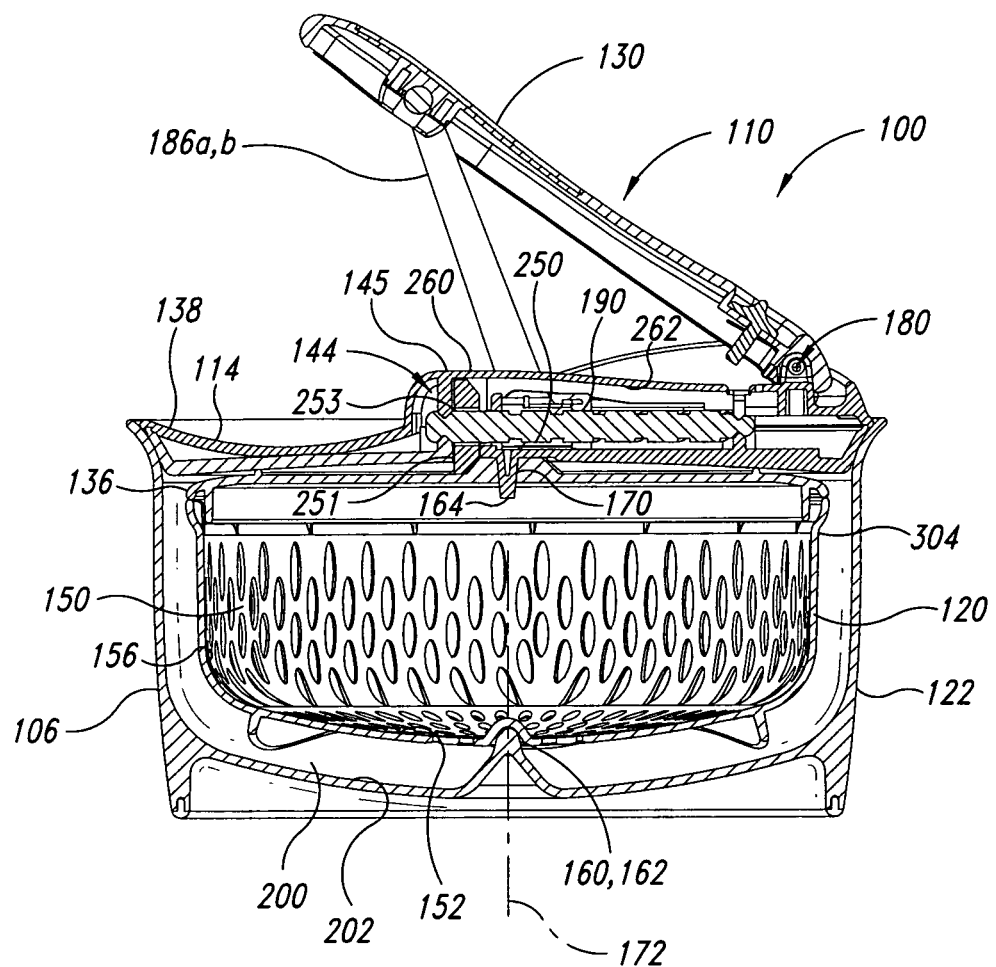
FIG. 3 is a cross-sectional view of the processing system taken along the line 3-3 of FIG. 1.

FIGS. 1-3 illustrate a processing system 100 for spinning contents held therein. The illustrated processing system 100 includes a main body 106 and a lever system 110 movably coupled to the main body 106. The main body 106 includes a cover assembly 114 removably coupled to an inner container 120 and/or an outer container 122 surrounding the inner container 120. The lever system 110 includes an actuatable lever 130 connected to the inner container 120 via a drive system 144 disposed in a drive system housing 145. In response to moving the lever 130 from an open position (FIGS. 1-4) to a closed position (FIG. 5), the drive system 144 rotates the inner container 120, and any contents in the inner container 120, relative to the outer container 122 and the cover assembly 114.

The cover assembly 114 of FIG. 2 includes inner and outer covers 136, 138 that mate with the inner and outer containers 120, 122, respectively. The inner cover 136 has a protruding drive member 140 configured to mate with the drive system 144 and to impart rotary motion to the inner cover 136 and the inner container 120 coupled to the inner cover 136 to rotate as a unit therewith.

The illustrated drive system 144 of FIGS. 1-3 converts pivoting motion of the lever 130 in a vertical orientation (as viewed) to rotary motion of the inner container 120 in a horizontal orientation (as viewed). Other types of drive systems can also be used.

The inner container 120 can be a perforated basket suitable for holding one or more items, such as foodstuff including, without limitation, vegetables, fruits, salad ingredients, and other consumable items used to prepare meals. In some embodiments, the perforated basket 120 is dimensioned to hold at least one serving of salad ingredients (e.g., greens, lettuce, and the like). The holding capacity of the basket 120 can be selected based on the desired number of servings prepared with the processing system 100.

In some embodiments, including the illustrated embodiment of FIG. 3, the inner cover 136 and the inner container 120 define a somewhat cylindrical holding chamber 150. Both a bottom 152 and a sidewall 156 of the inner container 120 and the inner cover 136 cooperate to form the illustrated holding chamber 150. Other configurations of holding chambers can also be employed.

With continued reference to FIG. 3, the outer container 122 can have an elongate alignment member 160 receivable in a corresponding recess 162 on the outer surface of the inner container 120. The outer cover 138 can also have an elongate alignment member 164 that extends into and through a passageway 170 (see FIG. 2) of the drive member 140. The members 160, 164 are generally conical protrusions that cooperate to define a container axis of rotation 172 about which the inner container 120 rotates with respect to the outer container 122. Exemplary protrusions can also be frustoconical in shape, bullet shaped, or any other suitable shape for defining an axis of rotation.

The chamber 150 can be interposed between the members 160, 164 such that any contents held in the inner container 120 are likewise rotated about the axis of rotation 172. For eccentric motion, the axis of rotation 172 is offset from an axis of symmetry of the chamber 150.

When the lever 130 is pivoted about a lever axis of rotation 180, the drive system 144 rotates the inner container 120. As the lever 130 is pivoted towards the closed position (indicated by the arrow 182 of FIG. 4), the arms 186a, 186b (collectively referred to as 186) push a slider 190 outwardly, as indicated by the arrow 192 of FIG. 4. To move the slider 190 in the opposite direction, the lever 130 is pivoted towards the open position. The slider 190 can thus be linearly reciprocated by angularly displacing the lever 130.

As shown in FIG. 3, the lever axis of rotation 180 is non-parallel with the container axis of rotation 172. The lever axis of rotation 180, in some embodiments, is proximate the periphery of the cover assembly 114 and spaced from the chamber 150. The lever axis of rotation 180 can be closer to an edge of the cover assembly 114 than to the container axis of rotation 172 such that the lever 130 is oriented generally radially with respect to the container axis of rotation 172. The lever axis of rotation 180 can also be at other orientations and positions.

Figure 4:
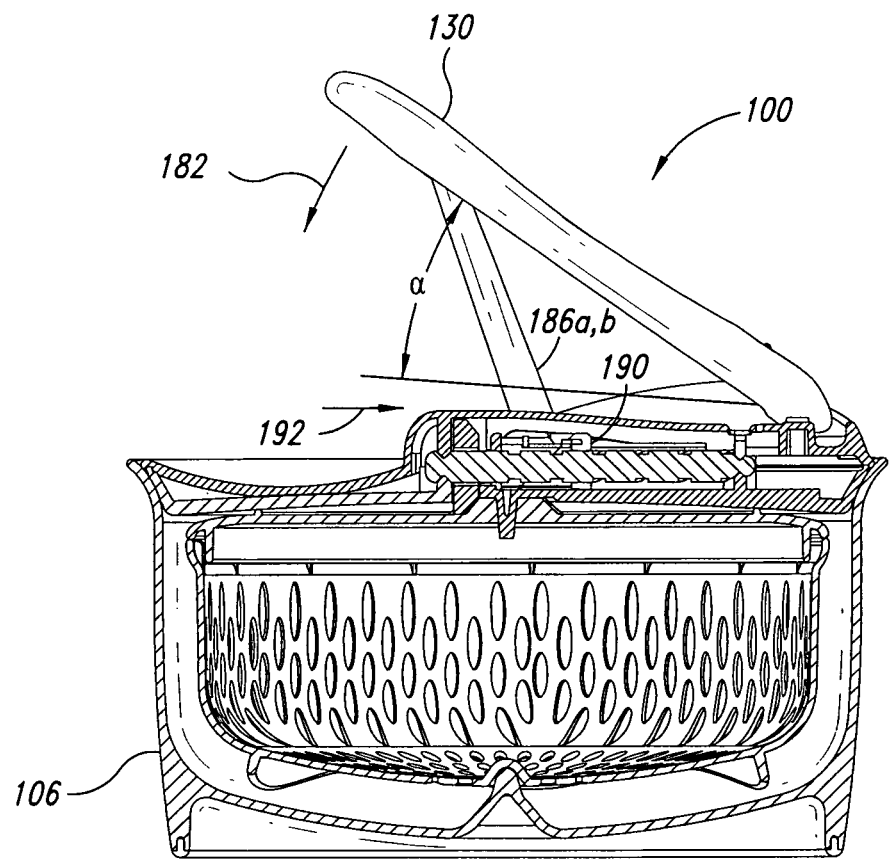
FIG. 4 is a side elevational view of a processing system, partially cut-away, wherein a lever is in an open position.
Figure 5:
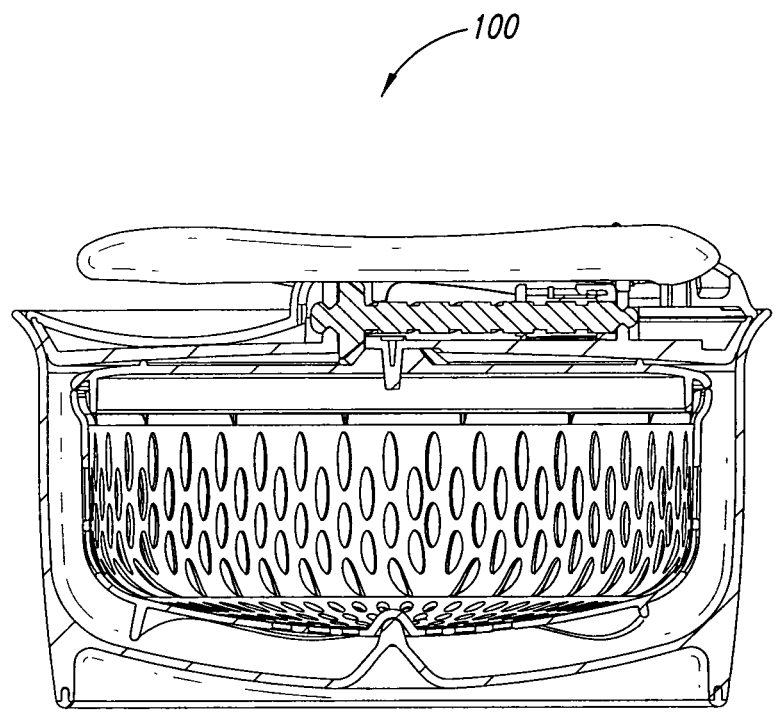
FIG. 5 is a side elevational view of the processing system of FIG. 4, wherein the lever is in a closed position.

The lever 130 can be pivoted through an angle α (FIG. 4). In some non-limiting embodiments, the lever 130 in the closed position and the open position defines an angle α of at least about 10 degrees, 20 degrees, 30 degrees, 40 degrees, or 50 degrees, 70 degrees, 90 degrees or ranges encompassing such angles. The main body 106 can conveniently rest on a support surface while the lever 130 is actuated, unlike traditional salad spinners with horizontally rotating handles.

When the inner container 120 is rotated at a sufficiently high rotational speed, the generated centrifugal forces cause liquids or other unwanted substances on the contents retained in the inner container 120 to travel radially toward and through the openings in the inner container 120. The expelled substances can then be collected in the space 200 (see FIG. 3) defined between the inner container 120 and the outer container 122 for subsequent disposal or consumption. If the removed substance is water, for example, the water can accumulate along a bottom 202 of the outer container 122.

Figure 6:
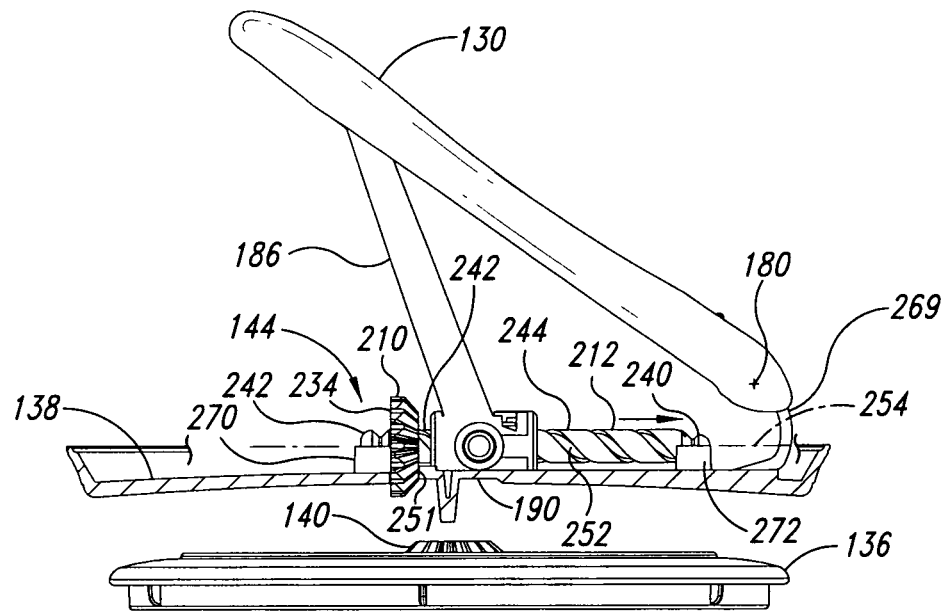
FIG. 6 is a partial cross-sectional view of a portion of the processing system of FIG. 1.
Figure 7:
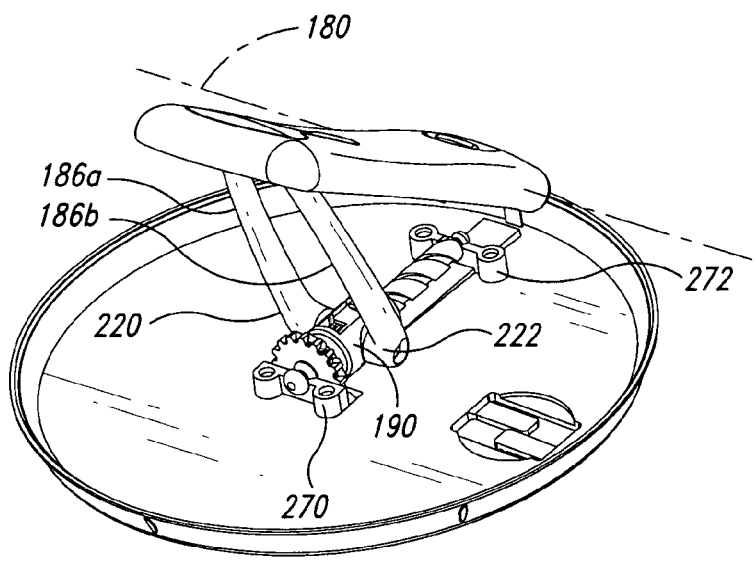
FIG. 7 is a perspective view of a lever system coupled to an upper cover, in accordance with one illustrated embodiment.
Figure 8:
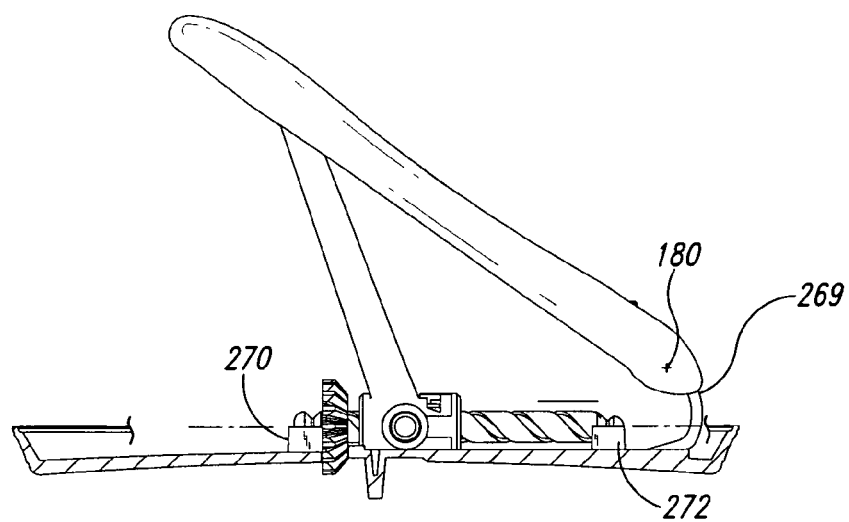
FIG. 8 is a side elevational view of the lever system coupled to the upper cover.

Referring to FIGS. 6 and 7, the drive system 144 includes a rotatable gear assembly 210 coupled to the outer cover 138, the slider 190 movable over at least a portion of the gear assembly 210, and the arms 186 pivotally coupled to both the lever 130 and the slider 190. The illustrated pair of pivoting arms 186 are disposed on either side of the slider 190.

Figure 9:
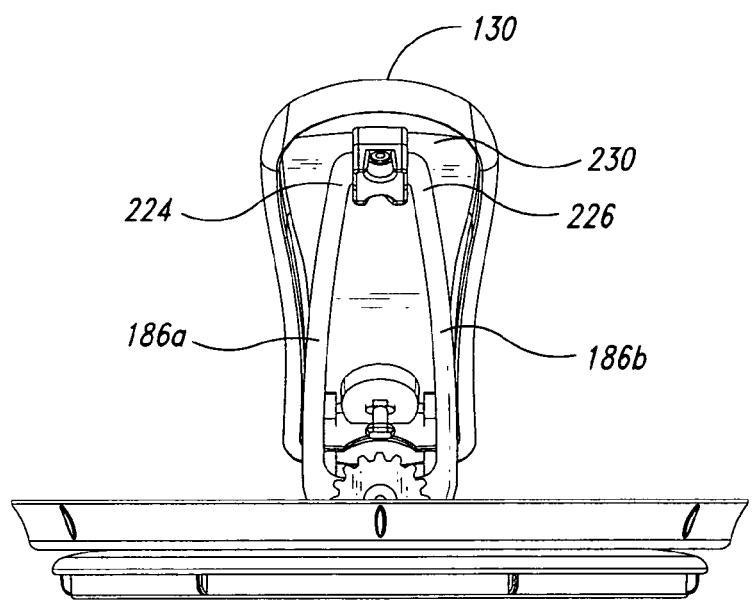
FIG. 9 is a front elevational view of the lever system coupled to the upper cover.

Lower ends 220, 222 of the arms 186a, 186b are pivotally coupled to the slider 190. As shown in FIG. 9, upper ends 224, 226 of the arms 186a, 186b are pivotally coupled to a bottom portion 230 of the lever 130. As such, each of the arms 186a, 186b is pivotally coupled to the lever 130 and the slider 190.

The rotatable gear assembly 210 of FIG. 6 can include an elongated member 212 and gear 234 fixedly coupled to the elongated member 212. The elongated member 212 has a first end 240, a second end 242, and an elongated member body 244 extending between the first and second ends 240, 242. The illustrated gear 234 is coupled to the second end 242 of the elongated member 212.

The elongated member 212 is threaded and extends through a through hole 250 (FIG. 3) in the slider 190. One or more engaging features of the slider 190 (e.g., a tooth extending inwardly from the slider 190 into the through hole 250) can be disposed within one or more helical slots 252 (FIG. 6) of the elongated member 212. Various types of threaded members or screws can be used to form the elongated member 212.

The engaging features can be followers, protrusions, or other types of elements suitable for cramming against sidewalls of a helical slot 252. As the slider 190 moves longitudinally along the elongated member 212, the engaging features can slide along the slot 252 thereby rotating the elongated member 212 about its longitudinal axis 254.

With continued reference to FIG. 6, the gear 234 can drivingly engage the drive member 140 of the inner cover 136. The gear 234 can be a bevel gear (including a spiral bevel gear), spur gear, or suitable type of drive member for transmitting torques. The illustrated gear 234 is in the form of a bevel gear having teeth spaced to mate and to mesh with corresponding teeth of the drive member 140.

The outer cover 138 has a window 251 through which a portion of the gear 234 extends, as shown in FIG. 3. The outer cover 138 also has a linear guide member 260 (FIG. 3) that slidably engages and rotationally fixes the slider 190. In some embodiments, a lower surface 262 of the linear guide member 260 has a curved surface shaped to mate with a complementary shaped outer surface of the slider 190, if needed or desired. Various types of retaining structures can be used to rotationally fix the slider 190.

The drive system 114 can have a clutch or other mechanism for allowing the inner container 120 to spin freely. The illustrated drive system 114 of FIG. 3 includes a bearing 253 (e.g., a one-way bearing) coupled between the elongated member 212 and the gear 234. Because of the bearing 253, the internal components can continuously or discontinuously move as the lever 130 is moved in the opposite direction. To maintain spinning of the inner container 120, the lever 130 can be pumped up and down repeatedly.

Referring to FIG. 6, the outer cover 138 includes a lever bracket 269 for pivotally retaining the lever 130 and a pair of mounting brackets 270, 272 for axially retaining the gear assembly 210. The ends 240, 282 of the gear assembly 210 are rotatably retained in the brackets 270, 272, respectively. The illustrated brackets 270, 272 of FIGS. 6 to 8 have curved cutouts that are sized to receive the ends 240, 282. In some embodiments, the brackets 270, 272 include bearings or other components for rotatably retaining the gear assembly 210.

The lever bracket 269 defines the lever axis of rotation 180. Some embodiments of the lever bracket 269 can define the lever axis of rotation 180 offset from the chamber 150, as noted above. Various types of brackets can be used to connect the lever 130 to the cover assembly 114.

Figure 10:
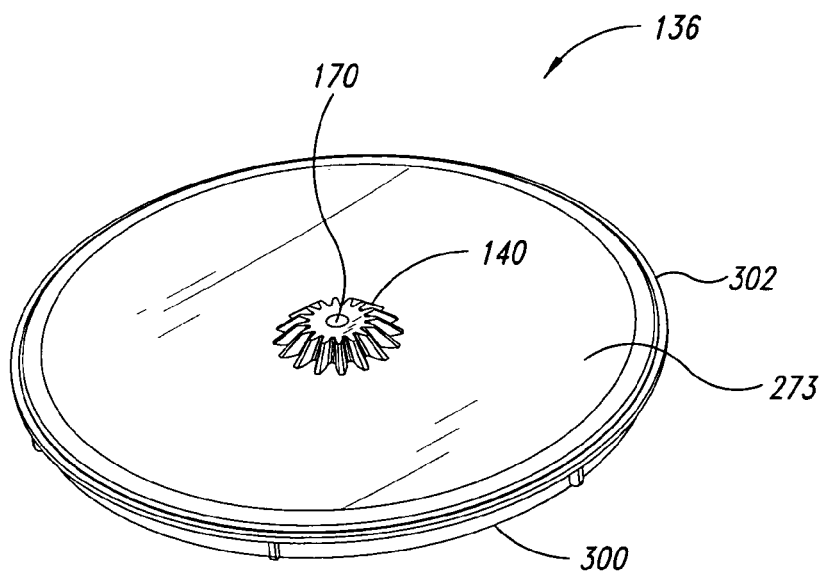
FIG. 10 is a perspective view of an inner cover of a processing system, in accordance with one illustrated embodiment.
Figure 11:
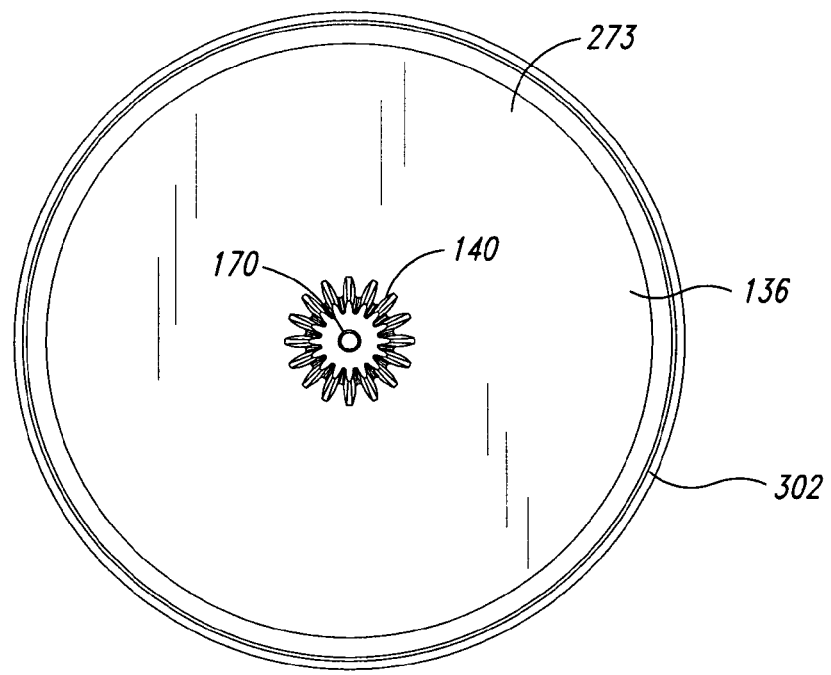
FIG. 11 is a plan view of the inner cover of FIG. 10.
Figure 12:
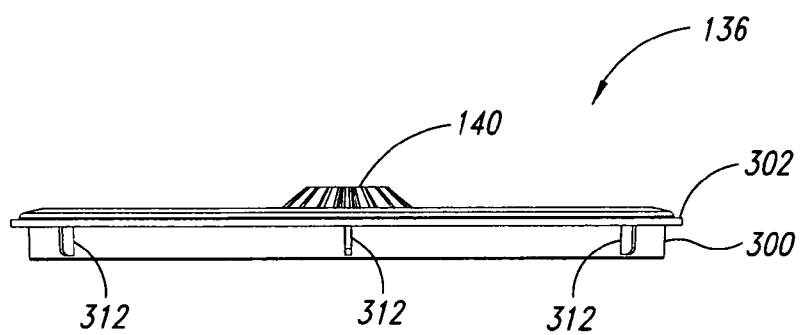
FIG. 12 is a side elevational view of the inner cover of FIG. 10.

FIGS. 10-12 illustrate the inner cover 136 having a generally circular main body 273, the drive member 140, and a cylindrical mounting flange 300. The mounting flange 300 is positioned at least proximate the outer edge 302 such that the flange 300 can be received in an upper portion 302 of the inner container 120, as shown in FIG. 3.

The drive member 140 is generally bevel gear integrally formed with the main body 273. The drive member 140 has the alignment feature 170 (in the form of a passageway) for receiving the member 164. Such an alignment feature 170 can therefore have a shape generally corresponding to the shape of the member 164. The illustrated alignment feature 170 is a tapered passageway that closely receives the member 164. During rotation of the inner container 120, the member 164 bears against the inner surface of the alignment feature 170. Other types of alignment features (e.g., protrusions, spindles, and the like) can also be used to maintain proper positioning of the cover assembly 114.

Referring to FIG. 12, the flange 300 can include one or more tabs 312 suitable for physically contacting the inner container 120 to limit, reduce, or substantially prevent relative movement between the inner cover 136 and the inner container 120. The tabs 312 can be evenly or unevenly spaced circumferentially along the flange 300. When assembled, the rotationally locked inner cover 136 and the inner container 120 can rotate in unison about the container axis of rotation 172. In some embodiments, the upper portion 302 of the inner container 120 has an array of receiving features (e.g., slots, recessed regions, and the like), each configured to receive one of the tabs 312. Various locking means can be employed to achieve the desired fit. In other embodiments, a frictional fit between the flange 300, without tabs, and the upper portion 302 is sufficient to prevent unwanted rotational movement between the inner cover 136 and the inner container 120. Additionally or alternatively, the upper cover 138 can also have a mounting flange 300 with or without tabs or other locking means.

Figure 13:
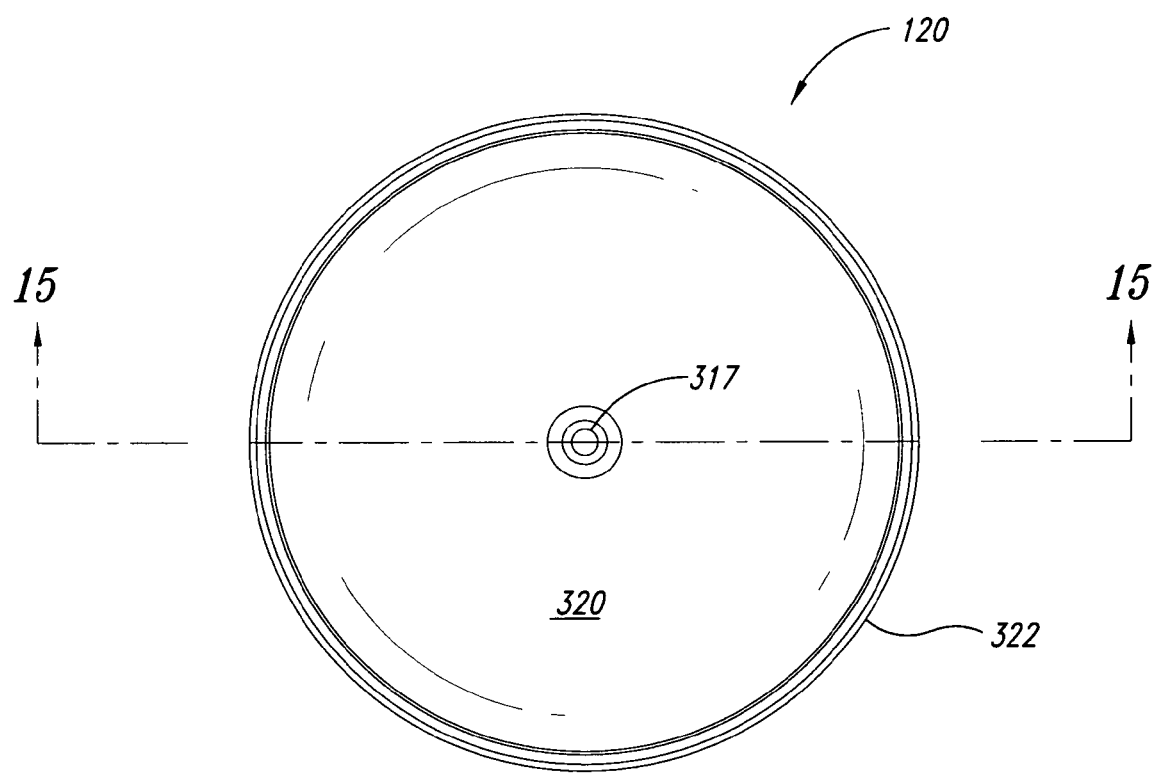
FIG. 13 is a plan view of an inner container of a processing system, in accordance with one illustrated embodiment.
Figure 14:
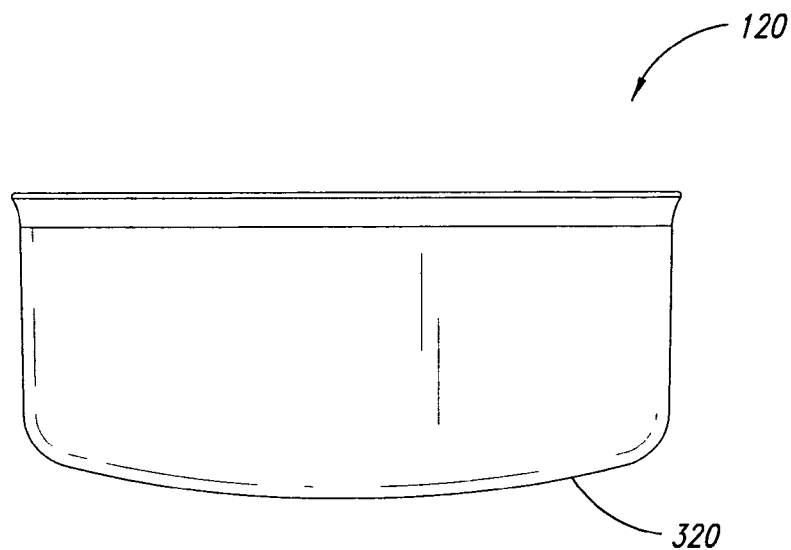
FIG. 14 is a side elevational view of the inner container of FIG. 13.
Figure 15:
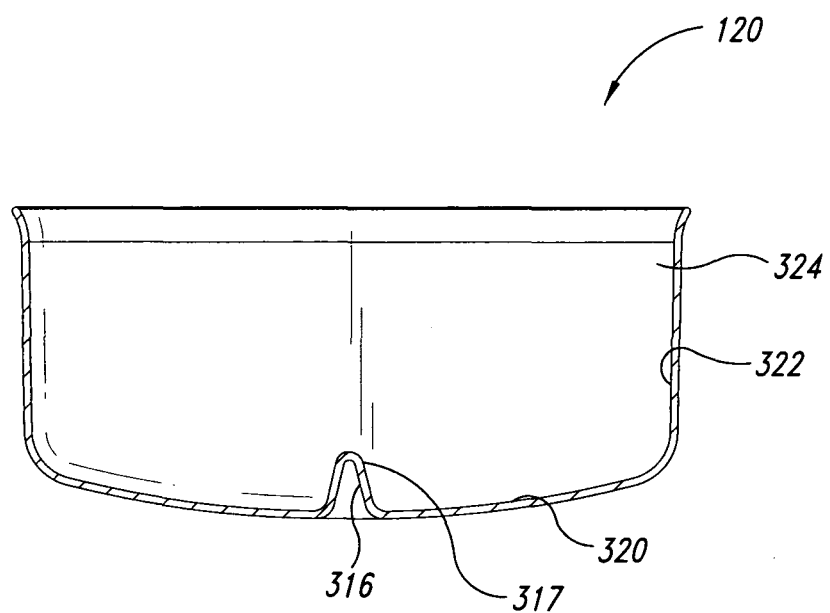
FIG. 15 is a cross-sectional view of the inner container of FIG. 13 taken along the line 15-15 of FIG. 13.

The inner container 120 of FIGS. 13 to 15 has an elongated alignment feature 317, a somewhat curved bottom 320, and a sidewall 322 that cooperate to define a holding space 324. The alignment feature 317 is a hollow generally conical structure that extends into the space 324. Openings (not shown) can be formed in the bottom 320 and/or sidewall 322. These openings can be sized based on the substances to be removed from the contents held in the holding space 324. In some embodiments, the openings can be sized for the passage of water therethrough. In some embodiments, the openings can be sized for the passage of particles (e.g., seeds, debris, etc.) therethrough. The openings can be generally circular, elongated (e.g., elongated slots orientated vertically, horizontally, or both), or other types of openings suitable for the passage of substances therethrough, especially when high centrifugal forces are applied.

The processing system 100 can also have other types of inner containers. For example, the inner container 120 can be a non-perforate bowl.

Figure 16:
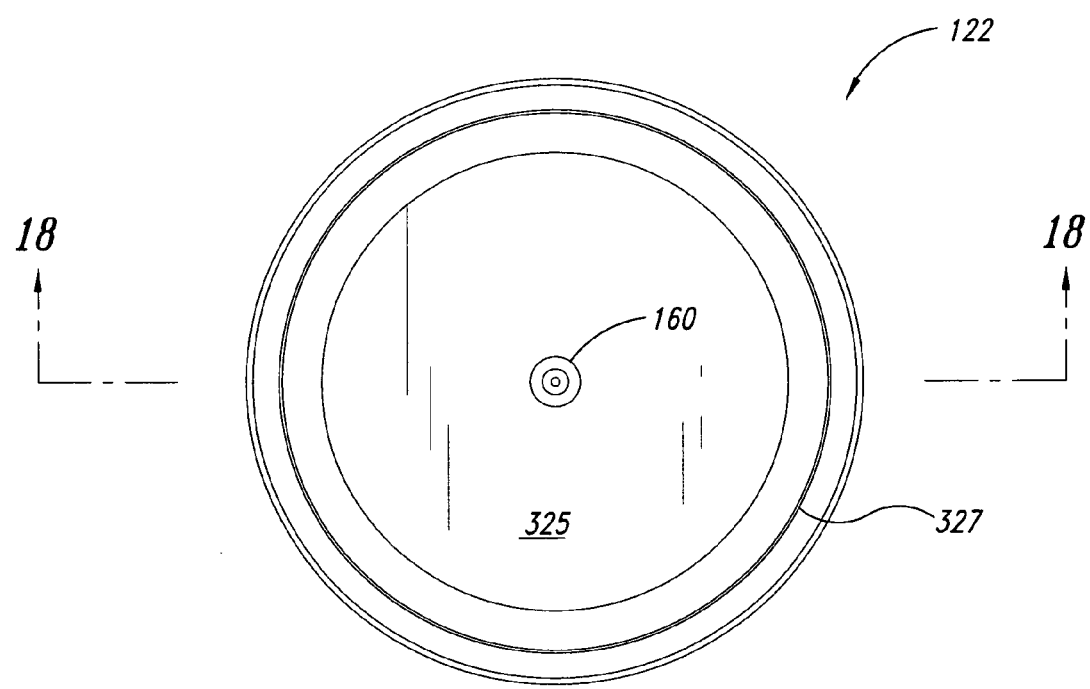
FIG. 16 is a plan view of an outer container of a processing system, in accordance with one illustrated embodiment.
Figure 17:
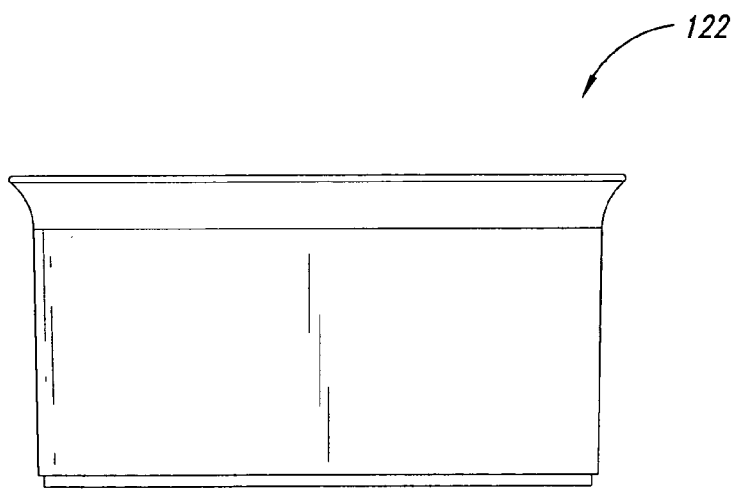
FIG. 17 is a side elevational view of the outer container of FIG. 16.
Figure 18:
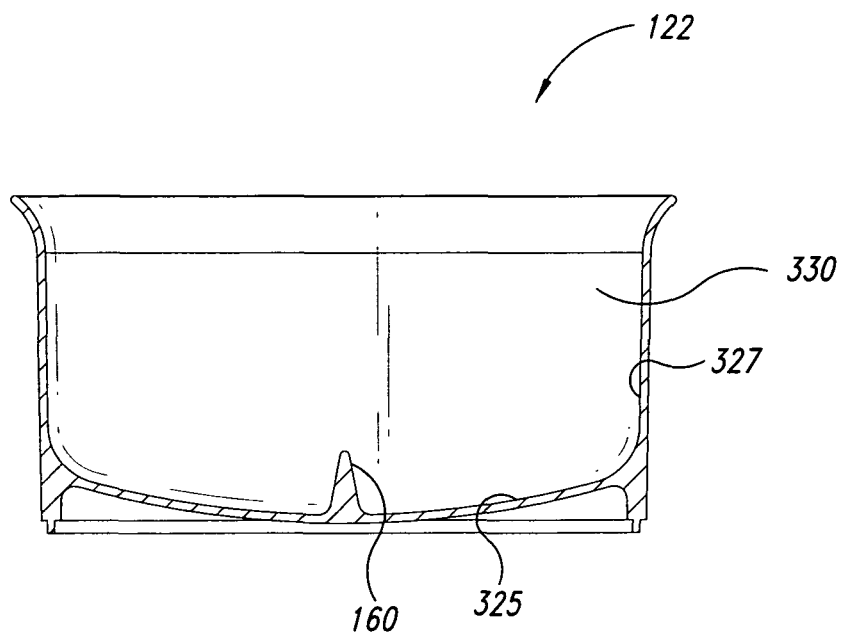
FIG. 18 is a cross-sectional elevational view of the outer container of FIG. 16 taken along the line 18-18 of FIG. 16.

FIGS. 16 to 18 show the outer container 122 having a shape similar to the shape of the inner container 120. As such, the inner container 120 can be nested in the outer container 122. The illustrated outer container 122 has the member 160, curved bottom 325, and sidewall 327 that cooperate to define a holding space 330. As noted above, the member 160 is configured to fit within the recess 162 of the alignment feature 317.

Figure 19:
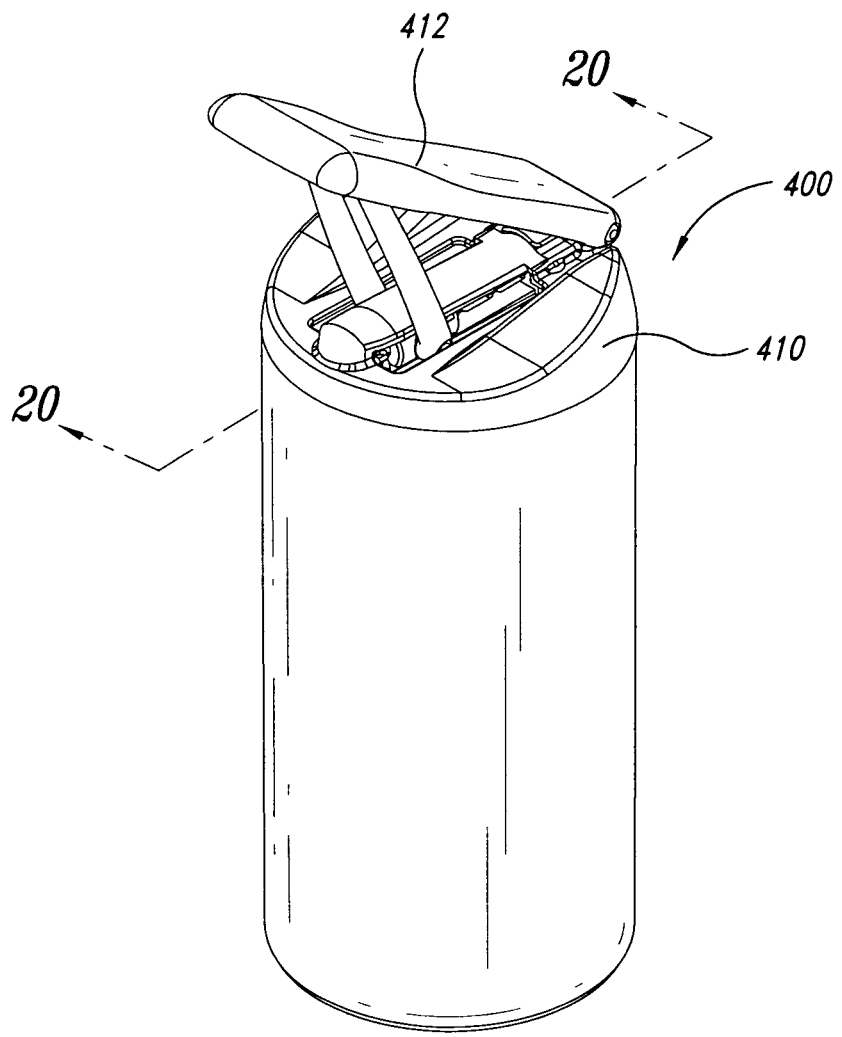
FIG. 19 is a perspective view of a processing system, in accordance with another illustrated embodiment.
Figure 20:
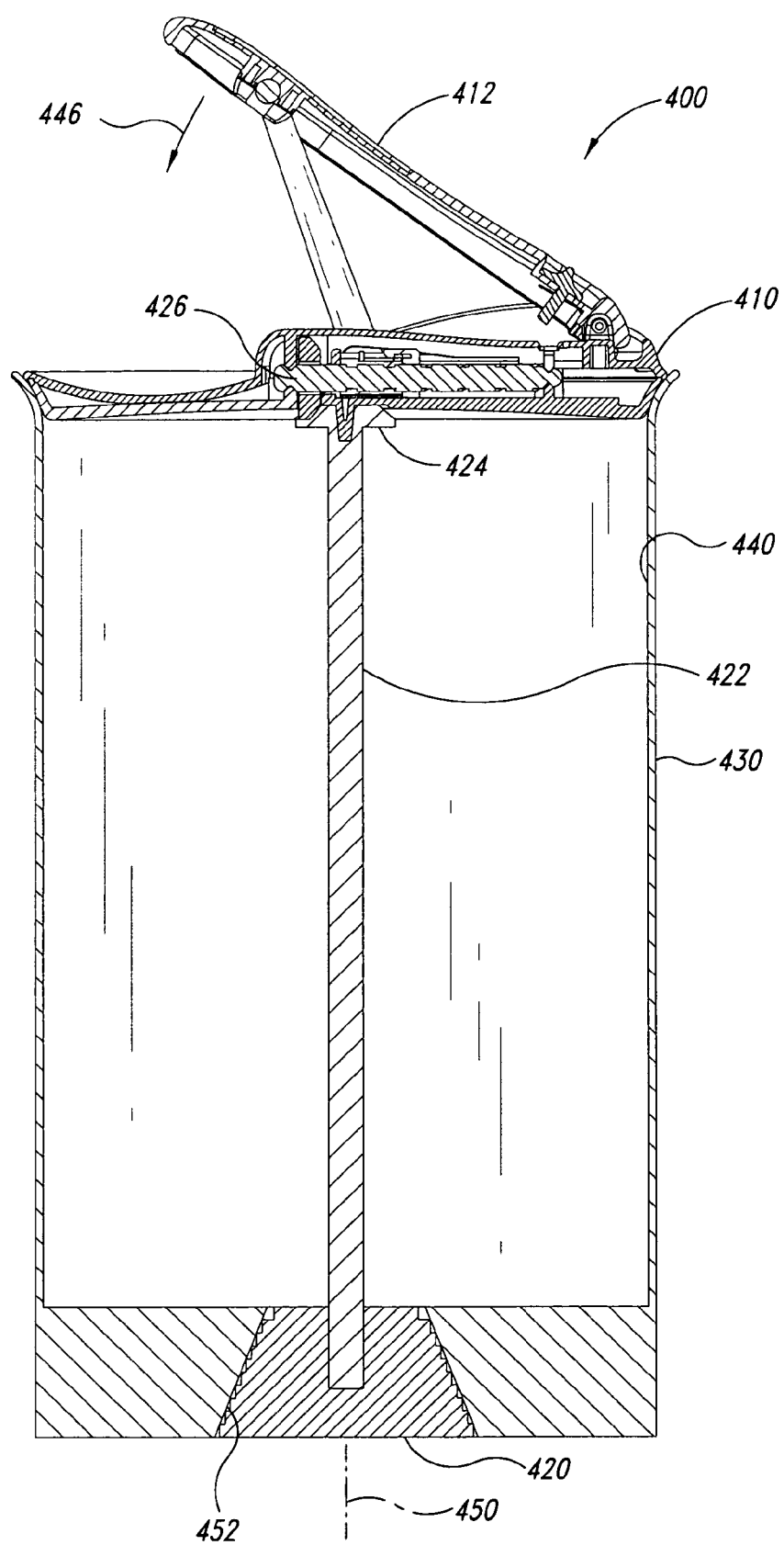
FIG. 20 is a cross-sectional view of the processing system of FIG. 19 taken along the line 20-20 of FIG. 19.
Figure 21:
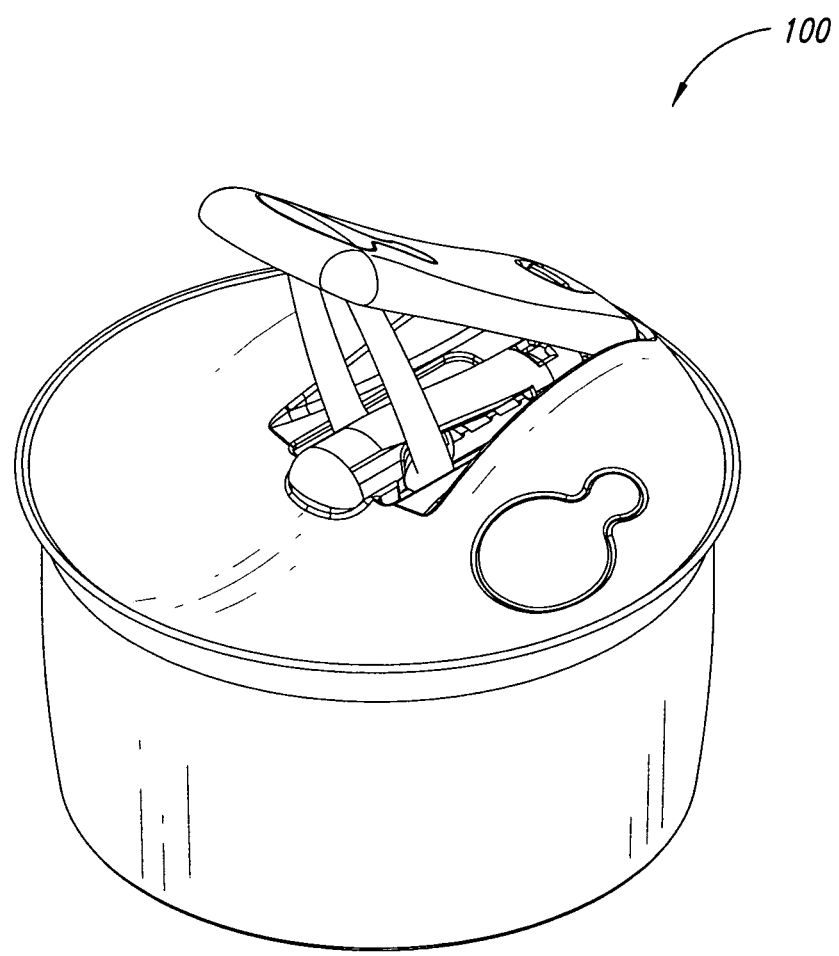
FIGS. 21-27 are several external views of a particular design for a processing system.
Figure 22:
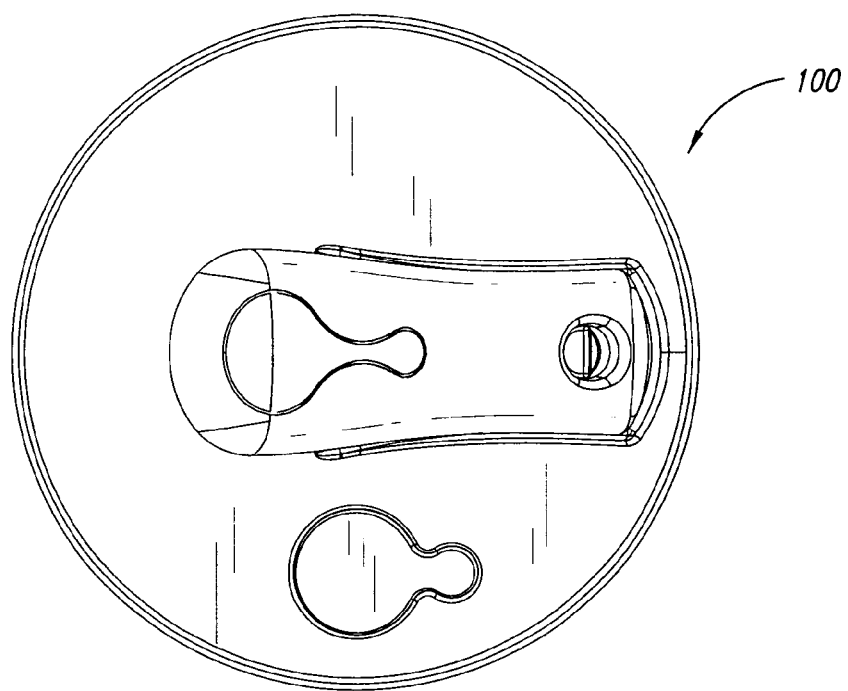
Figure 23:
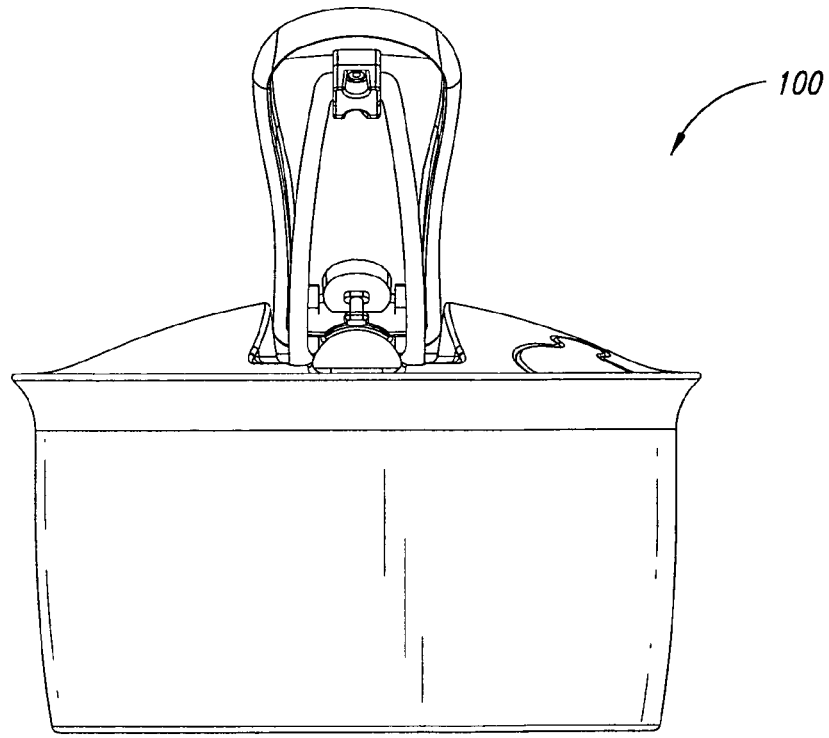
Figure 24:
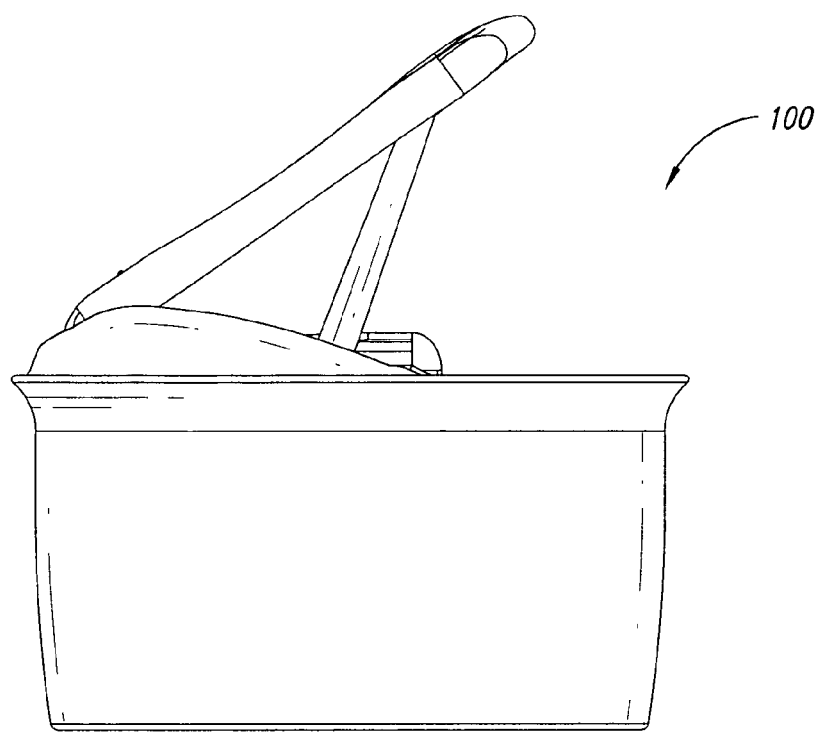
Figure 25:
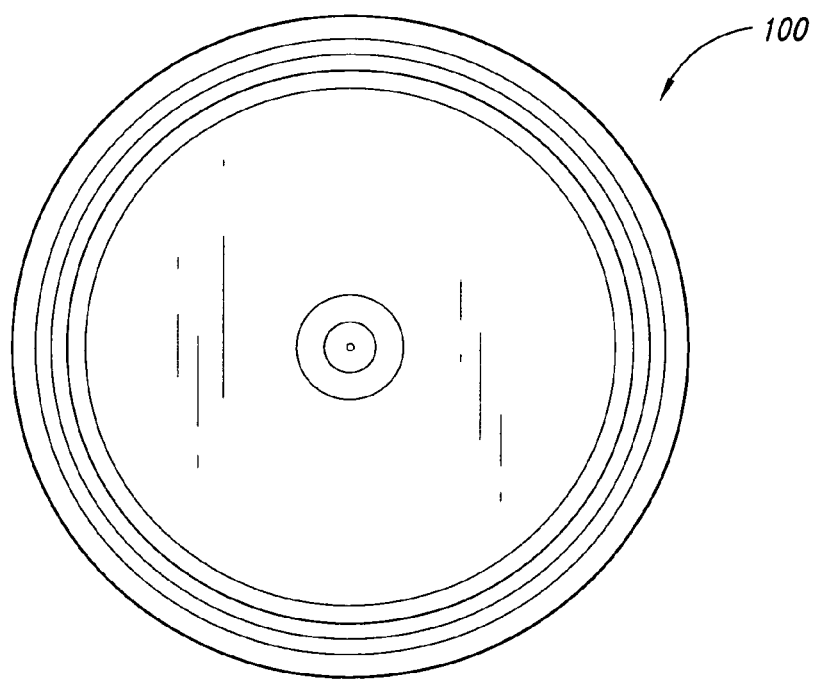
Figure 26:
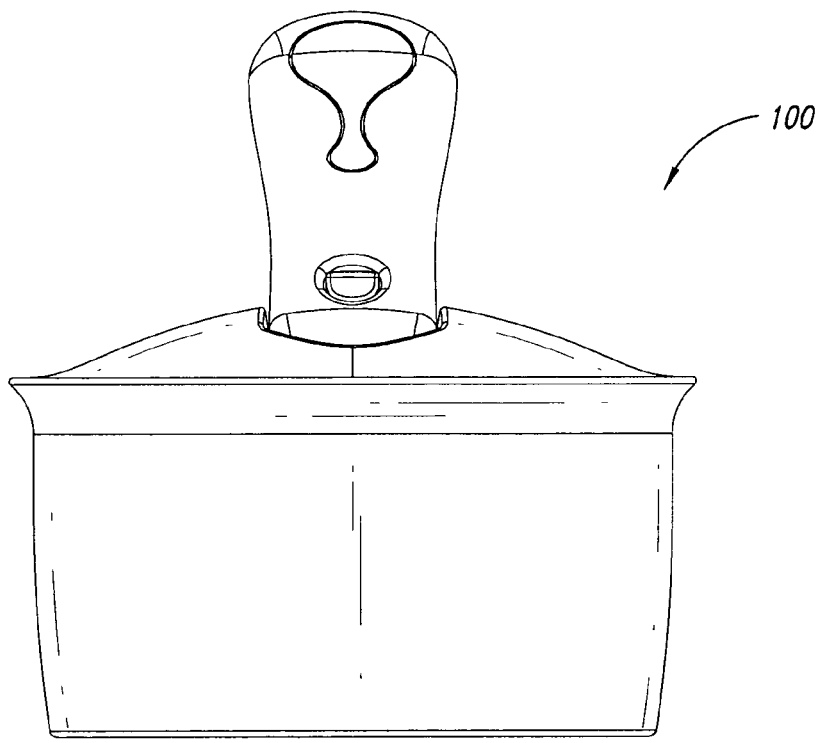
Figure 27:
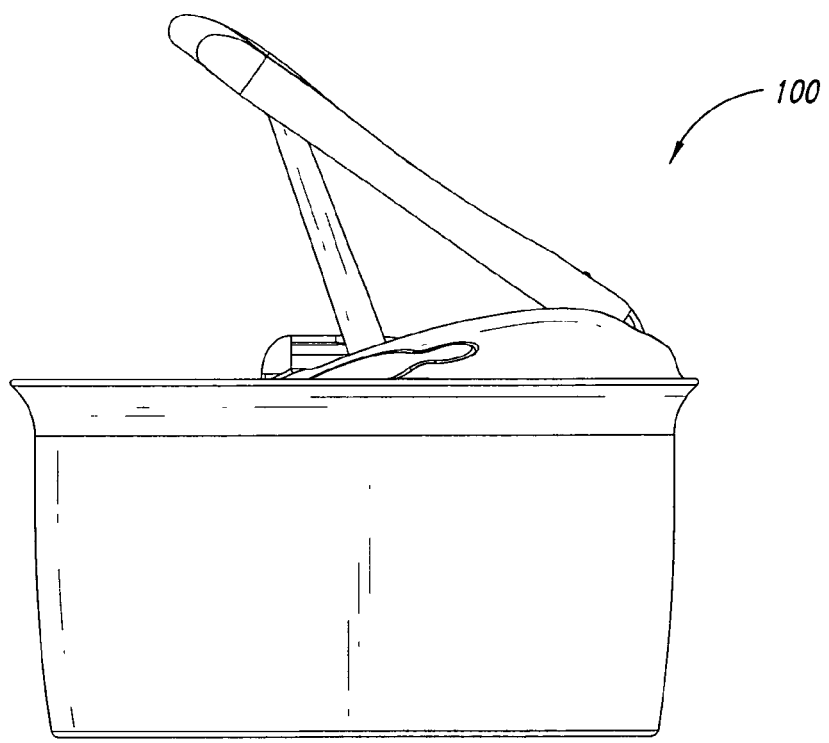

FIGS. 19 to 20 show a processing system 400 for grinding foodstuff. The illustrated processing system 400 may be generally similar to the processing system 100 of FIGS. 1-5, except as detailed below.

The processing system 400 has a cover assembly 410 and a lever system 412 pivotally to the cover assembly 410. The lever system 412 drives a grinding element 420 via a connecting rod 422 (illustrated as a drive shaft for driving the grinding element 420). The connecting rod 422 includes a drive member 424 that engages a drive system 426. A main body 430 of the processing system 400 defines a chamber 440 for holding foodstuff, such as peppercorns, coffee beans, spices, seeds, and the like.

In operation, the user can pivot the lever 412 from the open position (illustrated) to a closed position (indicated by the arrow 446) such that the connecting rod 422 and grinding element 420 rotate together about an axis of rotation 450. In this manner, the grinding element 420 rotates relative to a grinding surface 452 of the main body 430. Foodstuff in the chamber 440 can fall between the rotating grinding element 420 and the grinding surface 452. The grinding element 420 and the grinding surface 452 grind the foodstuff disposed therebetween. The ground foodstuff then falls from between the grinding element 420 and the grinding surface 452.

The lever 412 can be repeatedly pivoted between the closed and open positions to grind a desired amount of foodstuff. That is, the amount of foodstuff dispensed from the processing system 400 can be adjusted by increasing or decreasing the rotational speed of the lever 412.

The processing system 400 can also be used to grind, mill, dispense, sift, or otherwise process other types of foodstuff, including, without limitation, spices, fruits, vegetables, and the like. Additionally, various types of tools can be used with the processing systems disclosed herein. The term "tool" is broadly construed and may include, but is not limited to, a perforated basket (discussed in connection with FIGS. 1-5), a grinder (discussed in connection with FIGS. 19 and 20), milling element, cutting blades or elements, and the like.

Figure 28:
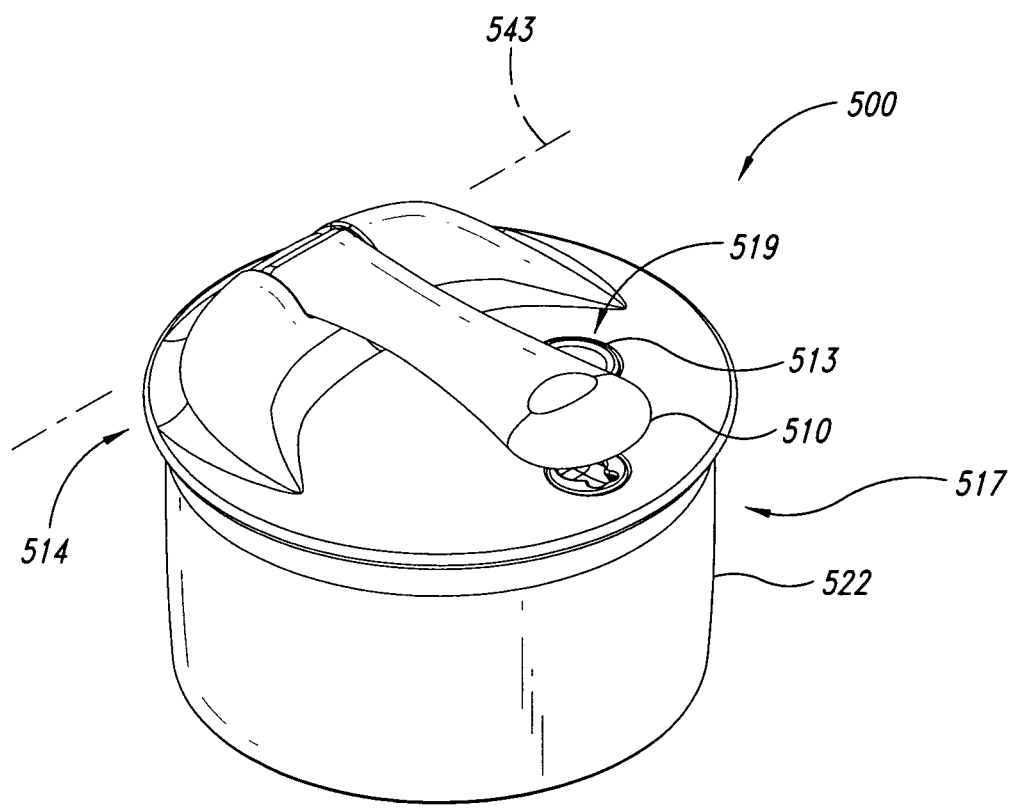
FIG. 28 is a perspective view of a processing system, in accordance with one illustrated embodiment.

FIG. 28 illustrates a processing system 500 that has a cover assembly 514 with a lever system 510 for rotating an inner container (e.g., a tool such as a perforated basket) and braking system 519 for reducing the rotational speed of the inner container. (The lever system 510 can be similar to the lever system 110 of FIG. 1.) A main body 517 includes an outer container 522 and the cover assembly 514 that can be removed from the outer container 522 to remove the processed food.

Figure 29:
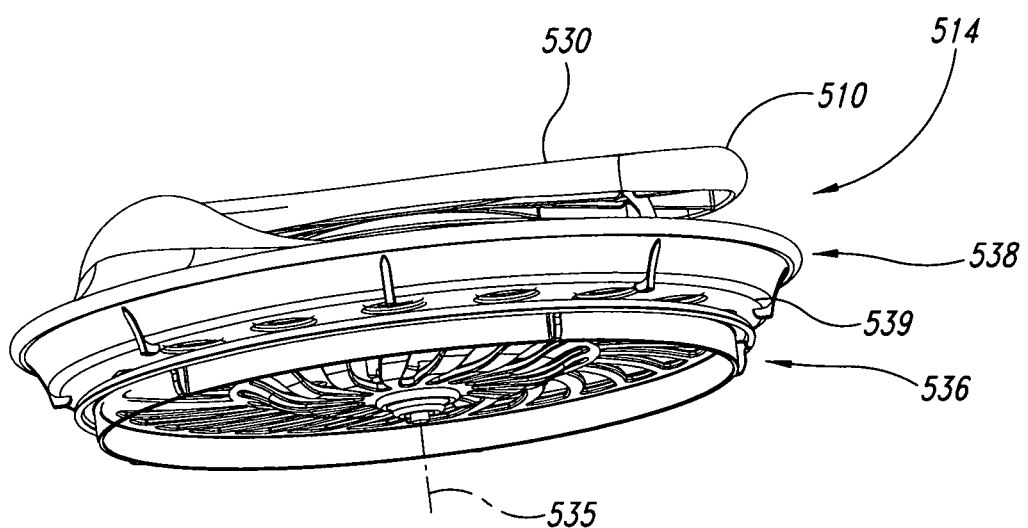
FIG. 29 is a perspective view of a cover assembly, in accordance with one illustrated embodiment.
Figure 30:
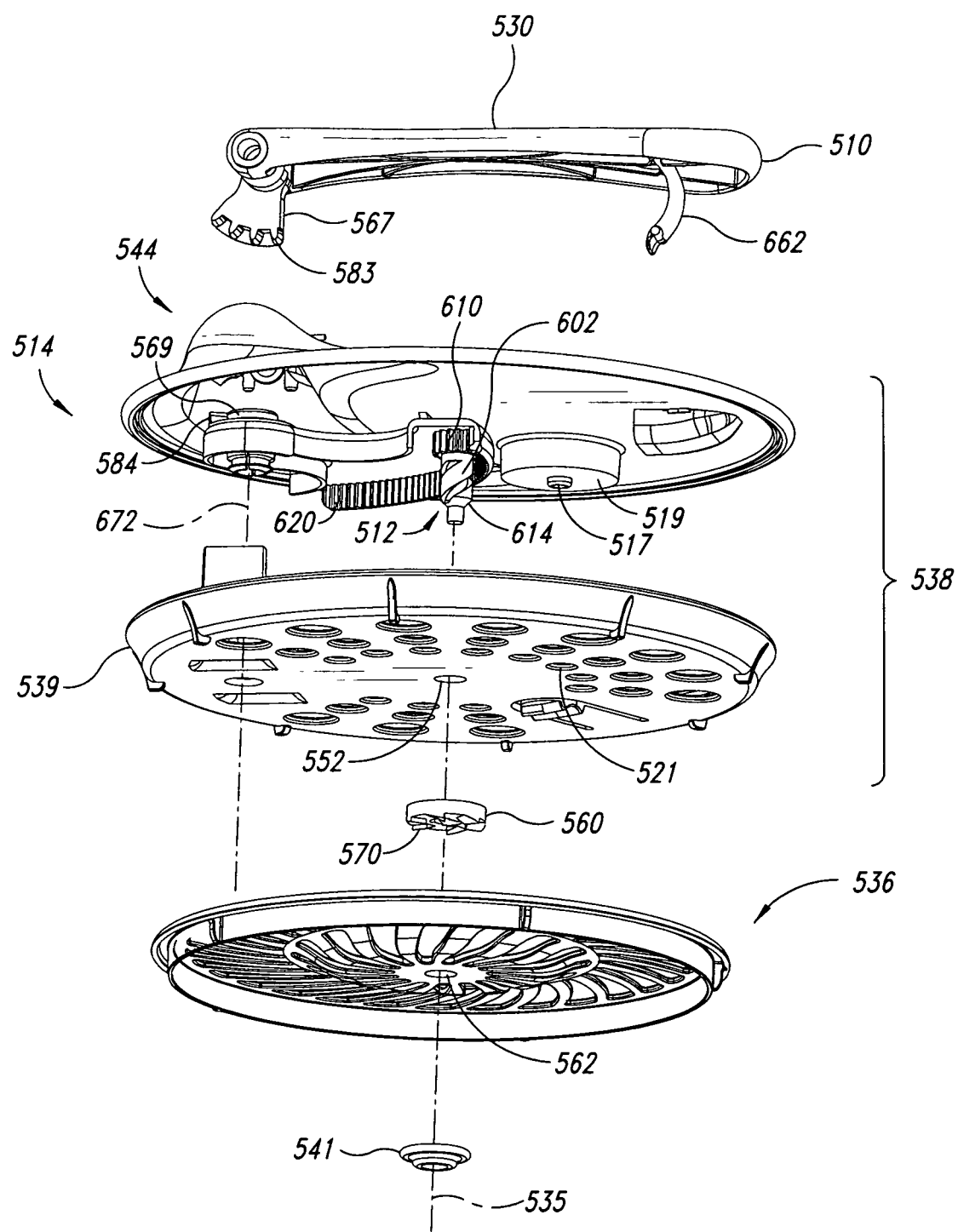
FIG. 30 is an exploded perspective view of a cover assembly, in accordance with one illustrated embodiment.

The cover assembly 514 of FIGS. 29 and 30 includes inner and outer covers 536, 538. The outer cover 538 can include a lid base 539. In some embodiments, the lid base 539 is fixedly coupled to the outer cover 538. In some embodiments, the lid base 539 is detachably coupled to the outer cover 538. In other embodiments, the lid base 539 is integrally formed with the outer cover 538.

A drive system 544 of FIG. 30 is operable to rotate the inner cover 536 about an axis of rotation 535 with respect to the outer cover 538 when a lever 530 of the lever system 510 is rotated about an axis 543 (FIG. 28). A retainer 541 can be coupled to a drive member 512, which extends through an opening 552 in the lid base 539 and an opening 562 in the inner cover 536. A slider 560 movably mounted to the drive member 512 can be sandwiched between the inner cover 536 and lid base 539. In some embodiments, the slider 560 is positioned along a section of the drive member 512 located between the lid base 539 and inner cover 536.

Figure 41:
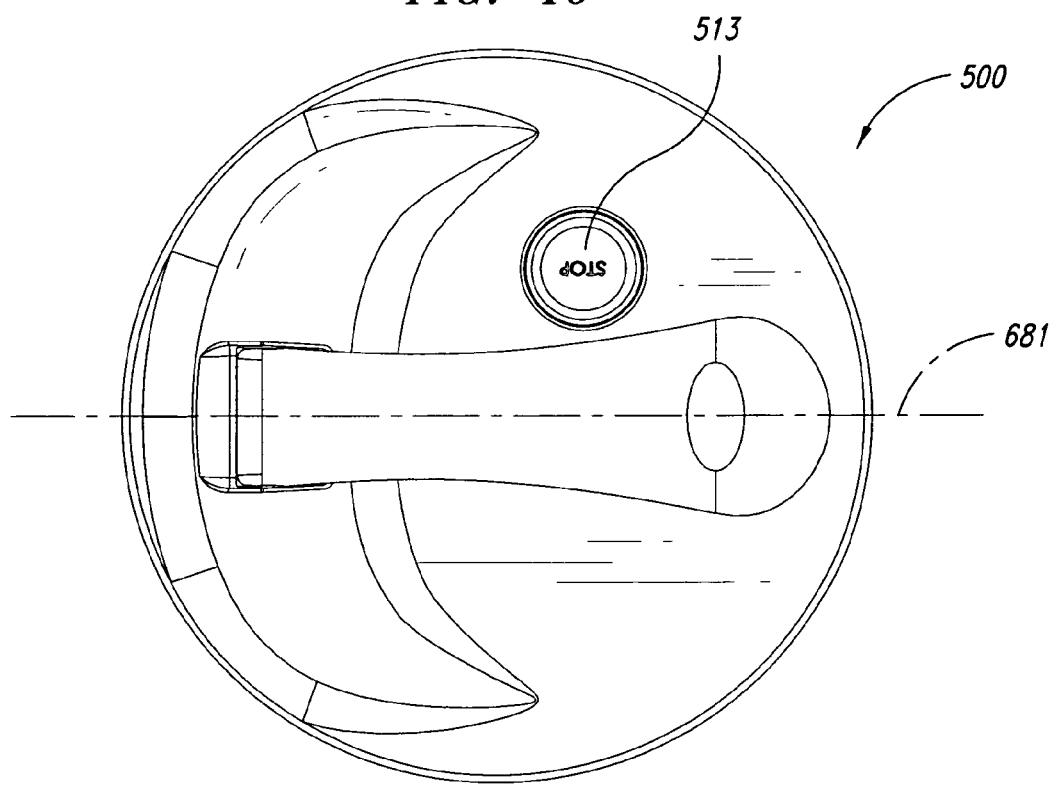
FIG. 41 is a plan view of a processing system, in accordance with one illustrated embodiment.
Figure 42:
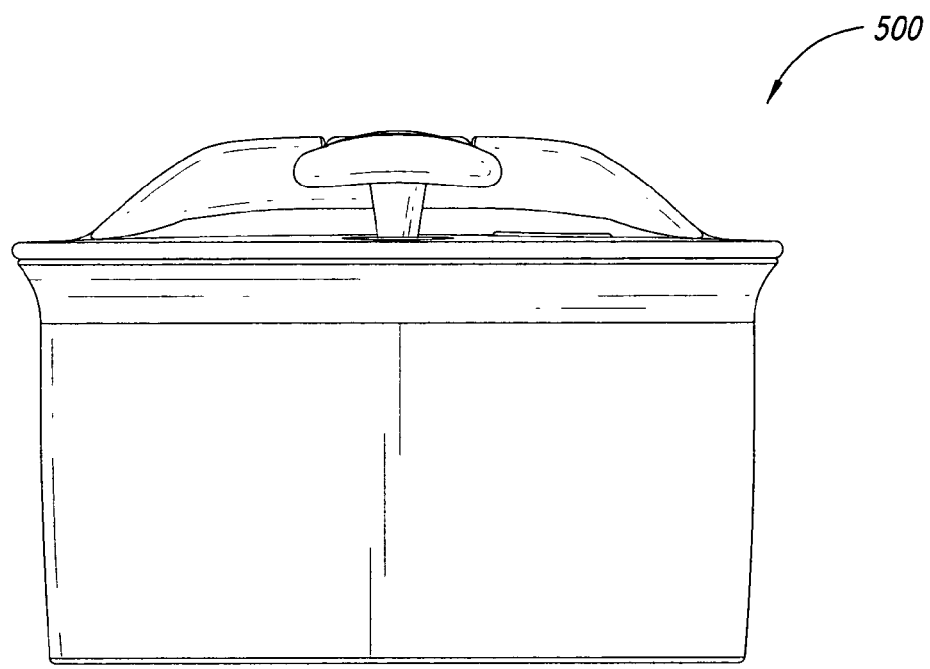
FIG. 42 is a front view of a processing system, in accordance with one illustrated embodiment.
Figure 43:
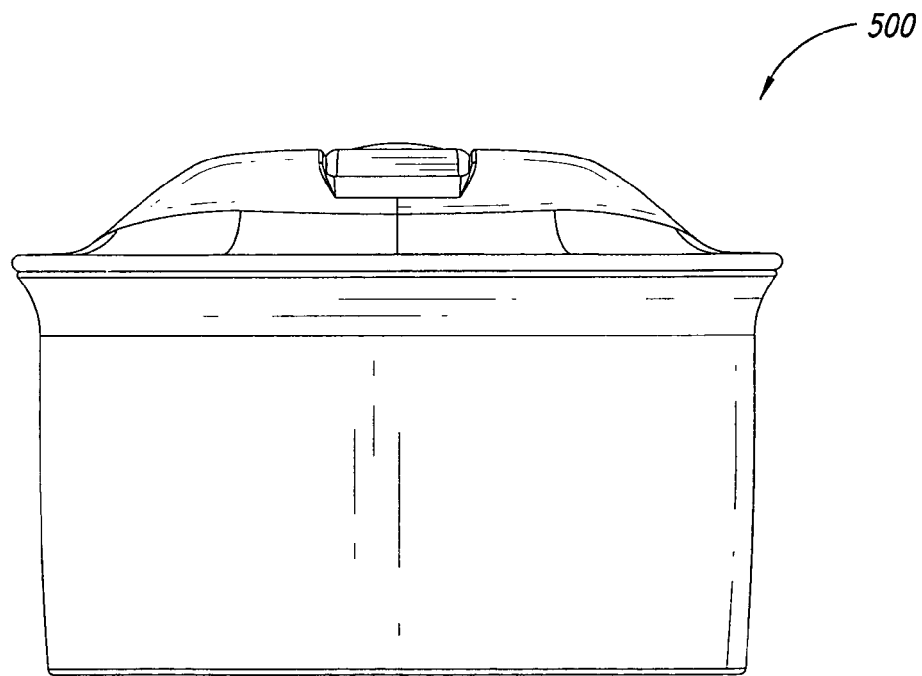
FIG. 43 is a back view of a processing system, in accordance with one illustrated embodiment.

The braking system 519 of FIG. 30 can include a depressible button 513 (see FIG. 41) and a movable braking member 517. A user can depress the button 513 to move the braking member 517 through an opening 521 in the lid base 539 and into engagement with the inner cover 536. Frictional interaction between the braking member 517 and the rotating inner cover 536 can effectively reduce the rotational speed of the inner cover 536.

The lever system 510 of FIG. 30 has drive gear 567 that engages a rotatable drive section 569. The drive gear 567 is fixedly coupled to the end of the lever 530. For example, the lever system 510 can have a one-piece or multi-piece construction. In some embodiments, the lever 530 and drive gear 567 are monolithically formed via a molding process, such as an injection molding process or compression molding process. The illustrated drive gear 567 of FIG. 30 includes teeth 583 that mate with teeth 584 of a rotatable drive section 569.

Figure 32:
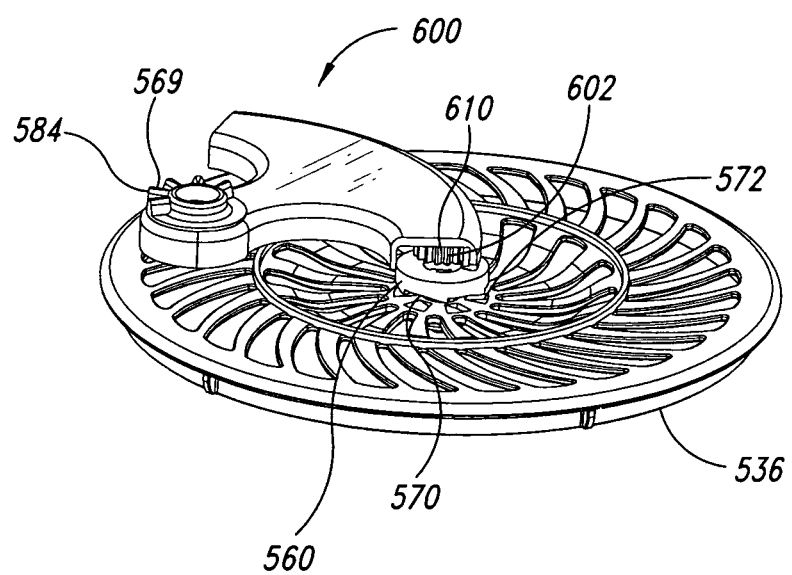
FIG. 32 is a perspective view of a portion of a rotatable drive assembly, in accordance with one illustrated embodiment.
Figure 33:
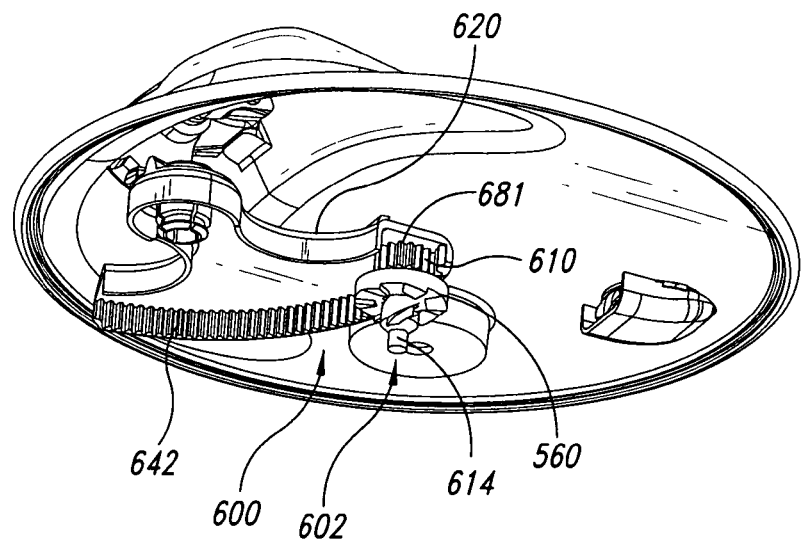
FIG. 33 is a perspective view of components of a cover assembly, in accordance with one illustrated embodiment.
Figure 34:
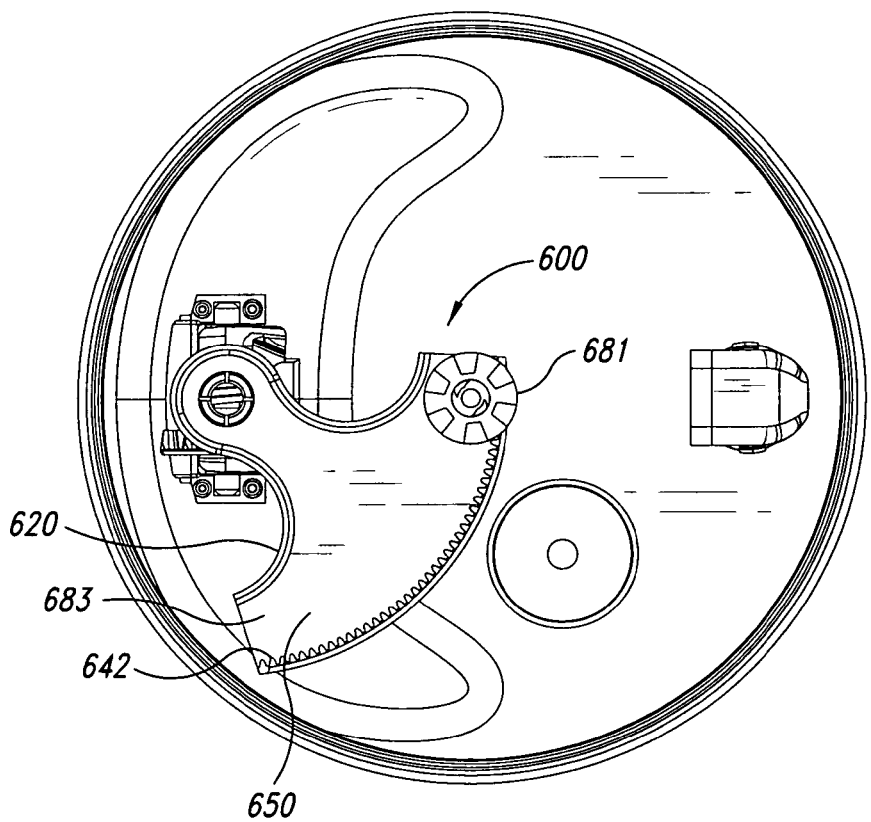
FIG. 34 is a bottom view of the components illustrated in FIG. 33.
Figure 35:
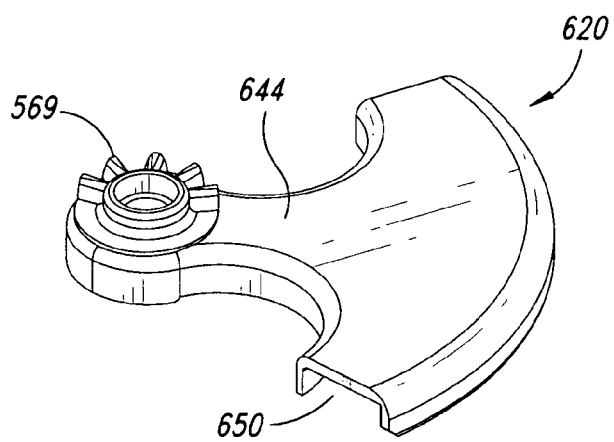
FIGS. 35-38 show a rotatable drive member, in accordance with one illustrated embodiment.

FIGS. 32-34 show a rotatable gear assembly 600 that includes a gear member 602 used to drive the inner cover 536 when the level system 510 is actuated. The gear member 602 includes a spur gear 610 and an elongated member 614 extending from the spur gear 610. The spur gear 610 mates with a drive member 620, and the elongated member 614 extends through slider 560 (illustrated in the form of a ratchet). Other types of rotatable gear assemblies can also be used.

The rotatable drive member 620 of FIGS. 35-38 has the drive section 569, an arcuate outer gear 642, and a main body 644 that defines a channel 650. The spur gear 610 disposed in the channel 650 can drivingly mate with the outer gear 642, which defines a non-linear outer periphery of the channel 650.

When the rotatable drive member 620 rotates about an axis of rotation 672 (FIG. 37) along a plane 673, the outer gear 642 causes rotation of the gear member 602, which is drivingly coupled to the lid base 539 via the slider 560.

Figure 36:
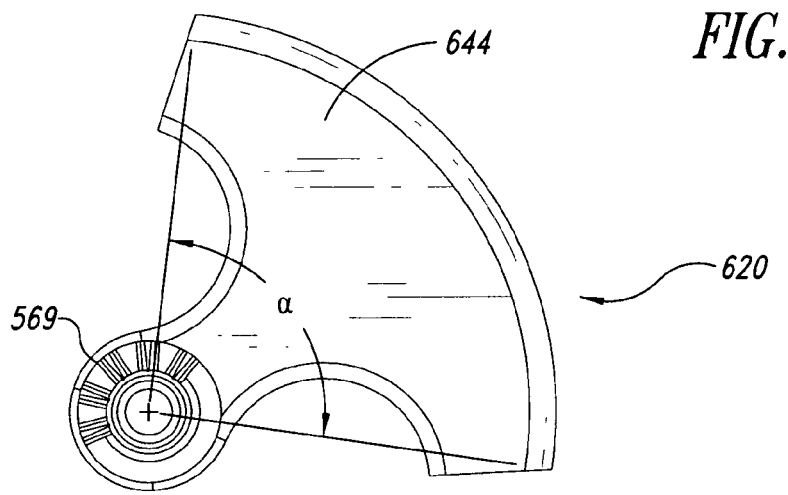
Figure 37:
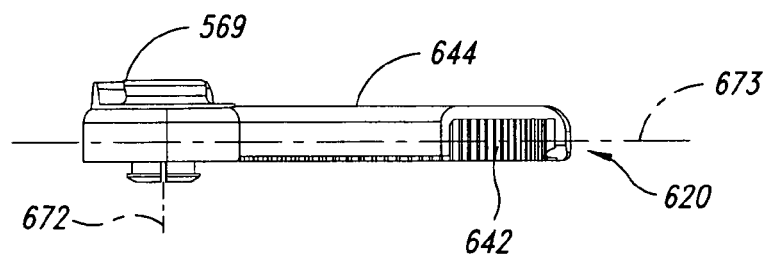
Figure 38:
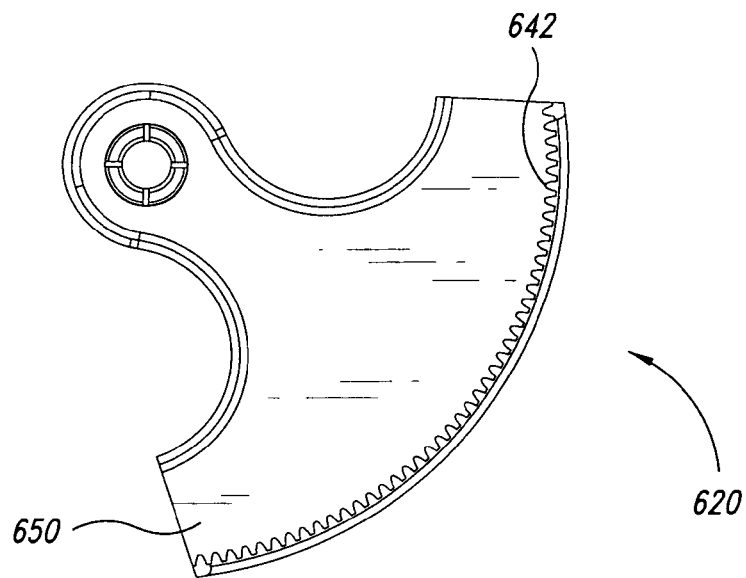
Figure 39:
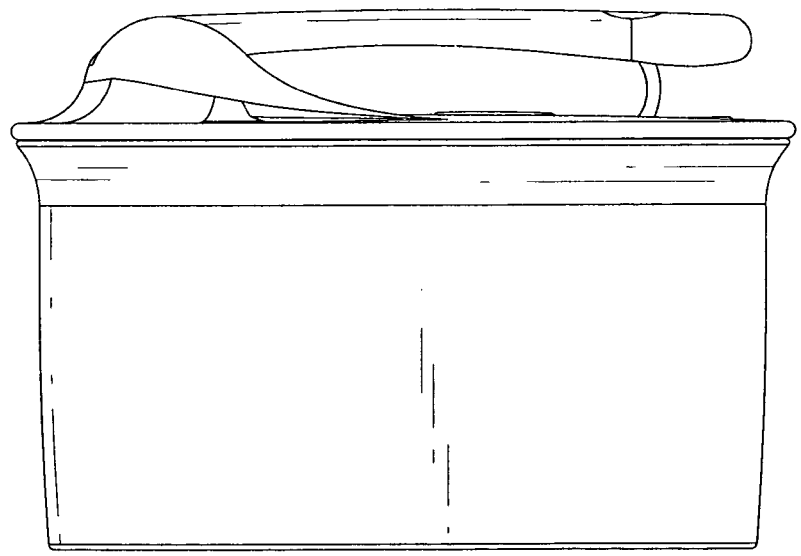
FIG. 39 is a side elevational view of a processing system, in accordance with one illustrated embodiment.
Figure 40:
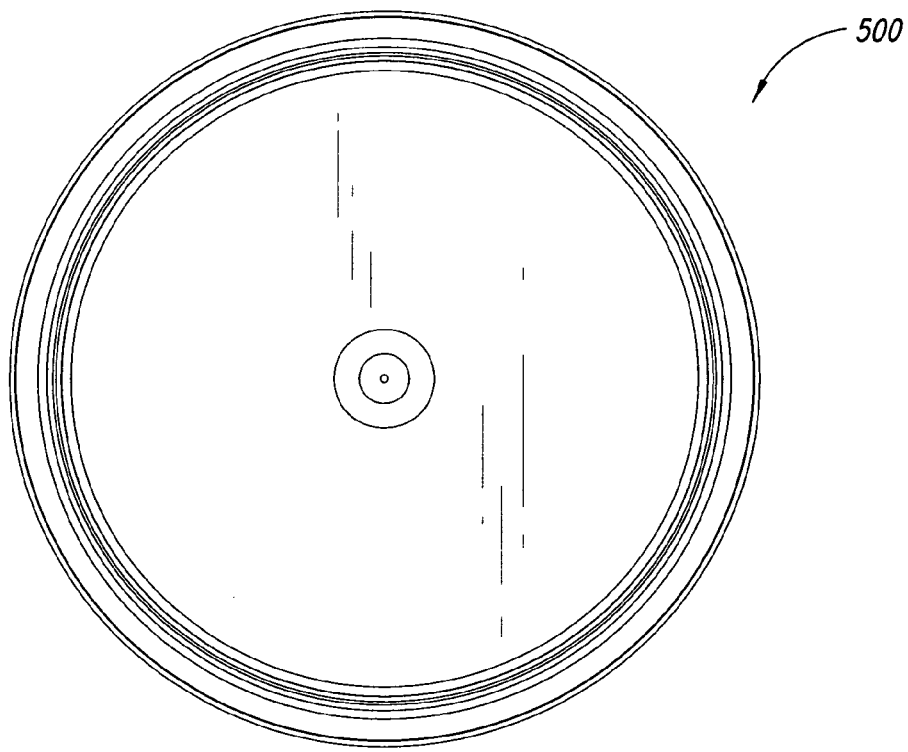
FIG. 40 is a bottom view of a processing system, in accordance with one illustrated embodiment.

Referring to FIG. 36, the rotatable drive member 620 defines an angle of α in the range of about 35 degrees to about 110 degrees. Other configurations are also possible. For example, the outer gear 642 can subtend an angle α in the range of about 45 degrees to about 110 degrees. Such rotatable drive member 620 can be rotated along a plane in a space between the inner and outer covers 536, 538.

Figure 31:
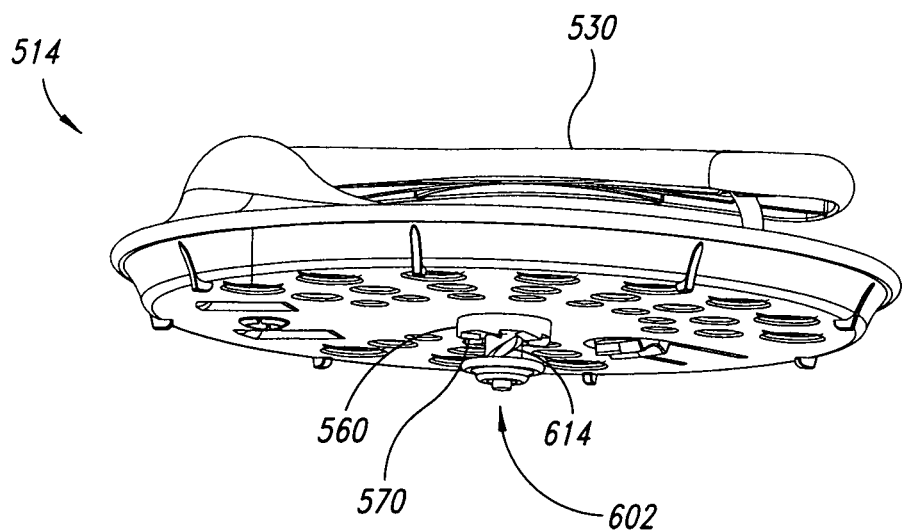
FIG. 31 is a perspective view of a cover assembly, in accordance with one illustrated embodiment.

Referring to FIG. 31, the slider 560 is movable between a disengaged position (illustrated) and an engaged position. When the lever 530 is actuated downwardly, the slider 560 moves downwardly from the illustrated disengaged position towards the inner cover 536 (shown removed in FIG. 31) until a plurality of teeth 570 of the slider 560 engage drive features 572 (e.g., teeth, slots, aperture, and the like) of the inner cover 536 (see FIG. 32). The slider 560 is not locked with the inner cover 536 when the lever 530 is stationary and/or moved upwardly, thus allowing the inner cover 536 to spin freely.

To rotate an inner container coupled to the inner cover 536, a latch 662 (see FIG. 30) can be opened to allow the lever 530 to move between a lowered latched position and a raised position. When the latch 662 is opened, a biasing member can move the lever 530 to the raised position. As the lever 530 is actuated downwardly along a plane 681 (FIG. 41), the interaction of the drive gear 567 and the gear section 569 causes rotation of the drive member 620 about the axis 672 such that the outer gear 642 causes rotation of the spur gear 610 at a first end 682 of the channel 650. The slider 560 slides longitudinally along the rotating elongated member 614 until the slider 560 mates with the features 572 of the inner cover 536. The slider 560 and the elongated member 614 rotate together causing rotation of the inner cover 536. Once the gear member 602 reaches the opposing second end 683 of the channel 650 (FIG. 34), the inner cover 536 can spin freely. The lever 530 can be moved upwardly such that the slider 560 either moves upwardly away from the inner cover 536 or slides over the inner cover 536. After the lever 530 is raised, the user can push down on the lever 530 again to further spin the inner container.

Figure 44:
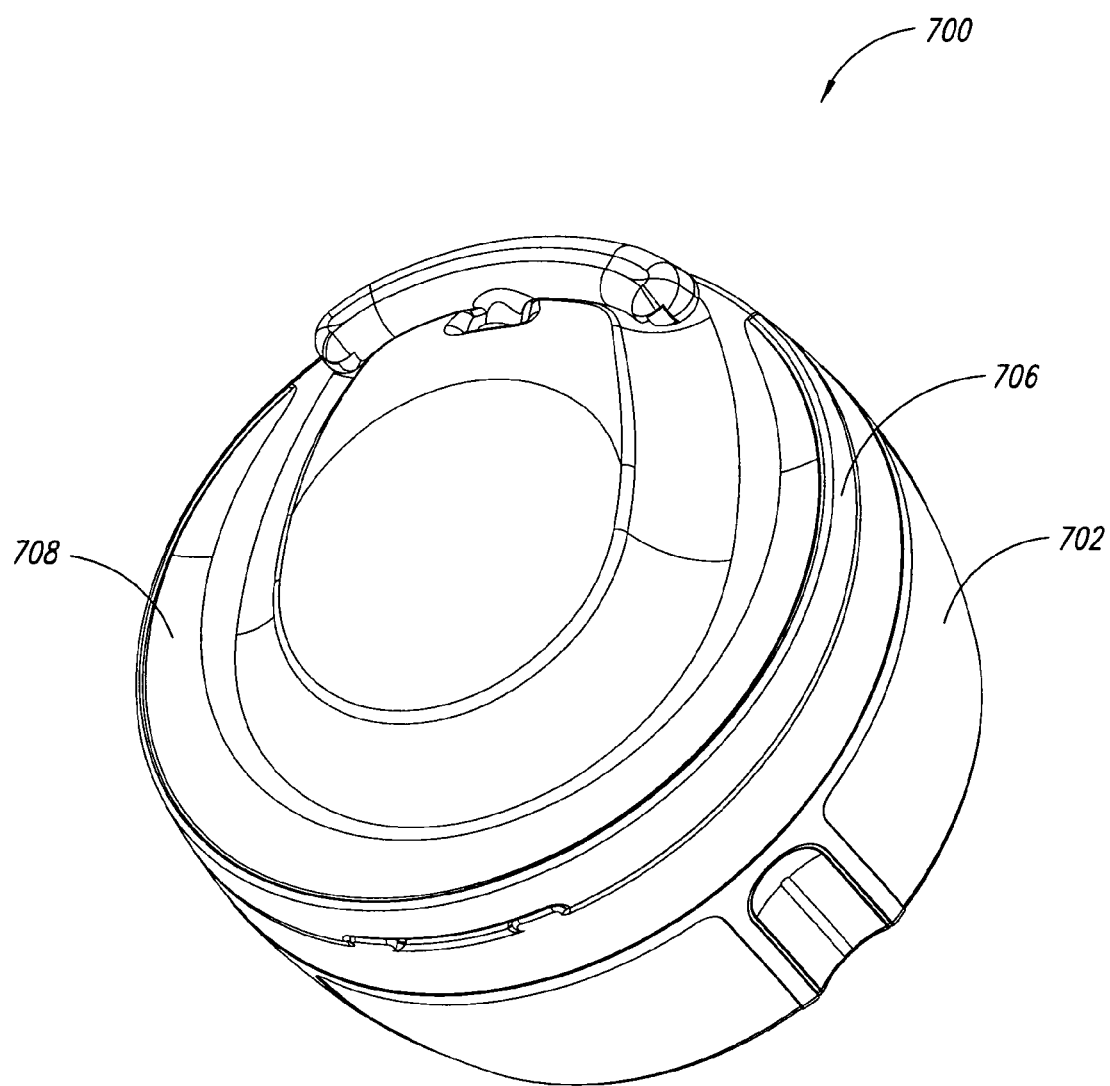
FIG. 44 is an isometric view of a processing system, in accordance with one illustrated embodiment.

According yet another embodiment, as illustrated in FIG. 44, a hand-held food processing system 700 is configured to facilitate processing of a food item, such as chopping, mincing, grinding, cutting, peeling or otherwise processing a food item, for example, garlic, onions, vegetables, dressings or other food items. The system 700 includes a cup 702 that defines at least a portion of a chamber 704 (FIG. 45) configured to receive and hold the food item. The cup 702 is removably coupled to a lid 706, which may be removably coupled to an optional cover member 708, providing for an ergonomic housing. As illustrated in FIG. 46, the cover member 708 can also serve to house other elements of the apparatus 700 between the lid 706 and the cover member 708, which may be desired to be positioned outside of the chamber 704, as will be described in more detail below.

Figure 47A:
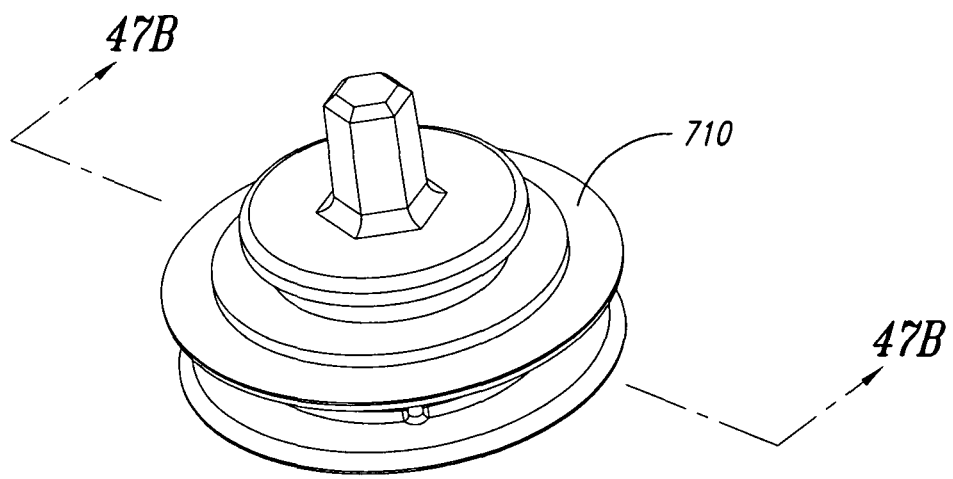
FIG. 47A is an isometric view of a portion of the processing system of FIG. 44.
Figure 47B:
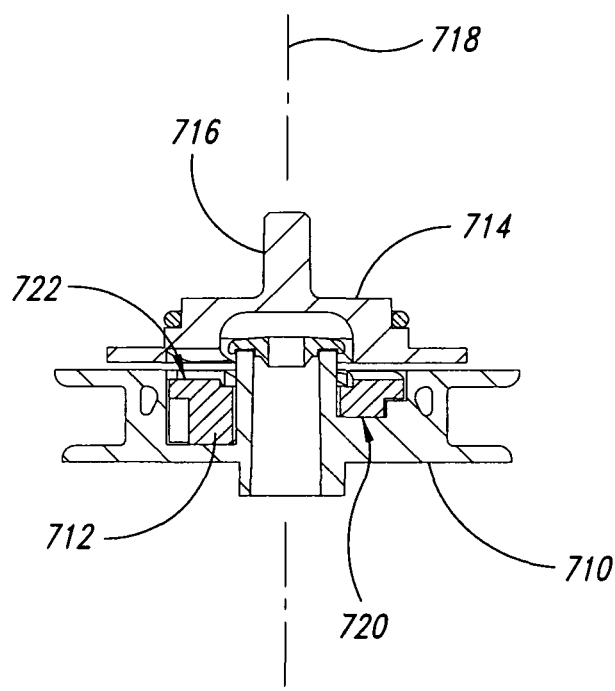
FIG. 47B is a cross-sectional view of the portion of the processing system of FIG. 47A, viewed across section 47B-47B.
Figure 48A:
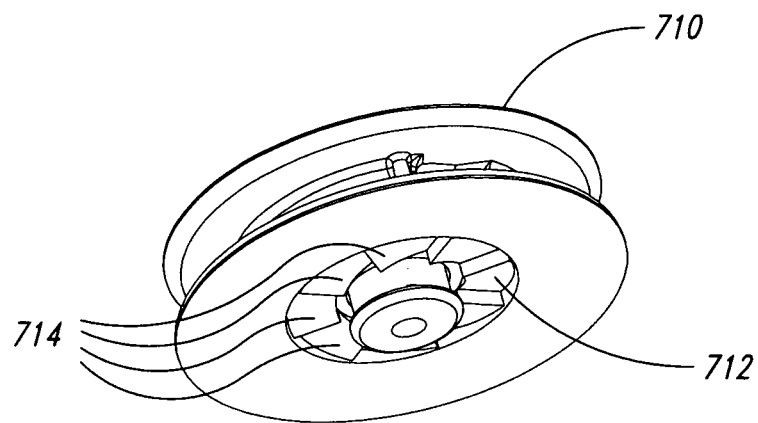
FIG. 48A is an isometric view of a portion of the processing system of FIG. 44.
Figure 48B:
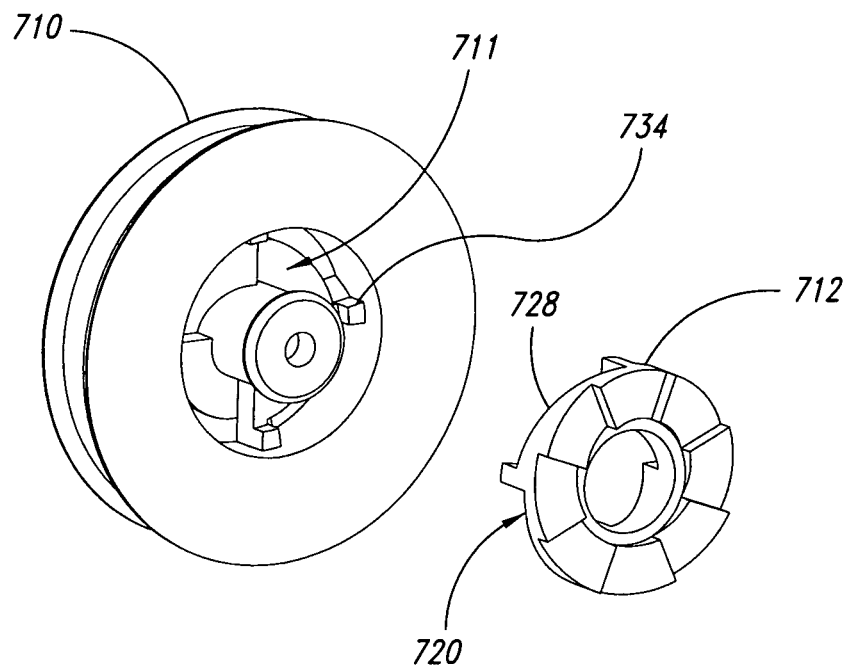
FIG. 48B is an isometric exploded view of the portion of the processing system of FIG. 48A.
Figure 49:
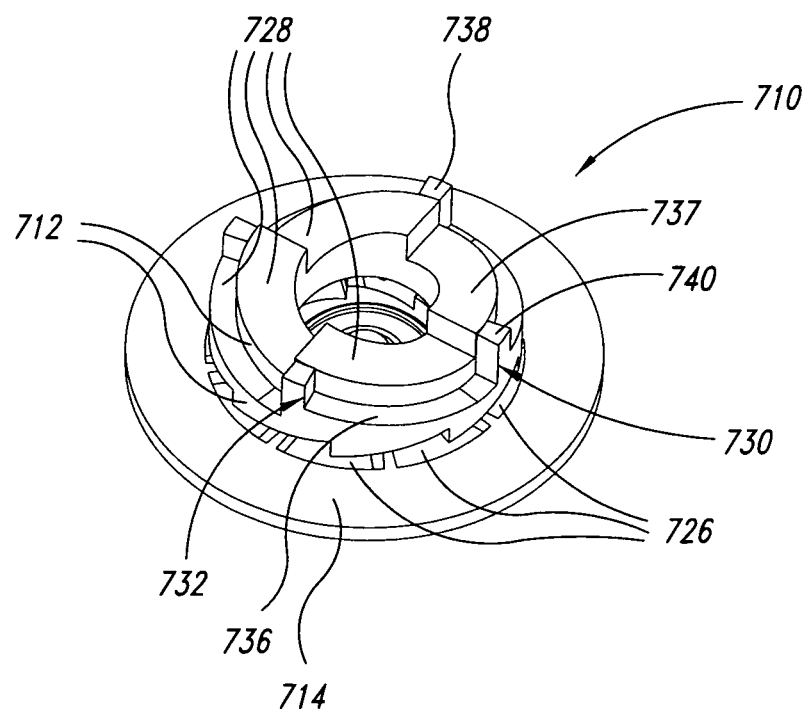
FIG. 49 is an isometric view of the processing system of FIG. 44.

As illustrated in FIG. 47B, which is a cross-sectional view taken from FIG. 47A, the system 700 further includes a drive mechanism 710, rotatably mounted with respect to the cup 702 (FIG. 44). As illustrated in FIG. 49, the system 700 further includes a ratchet mechanism having a ratchet wheel 712 and a drive wheel 714. Referring back to FIG. 47B, the drive wheel 714 is coupled to a drive shaft 716 extending along or in a direction of an axis 718. In one embodiment, the drive wheel 714 and the drive shaft 716 can be fabricated from a unitary body of material. As shown in FIGS. 48A and 48B, in one aspect, the ratchet wheel 712 can be positioned within a recess 711 in the drive mechanism 710, which faces toward the drive wheel 714 (FIG. 47B). The ratchet wheel 712 is positioned between the drive mechanism 710 and the drive wheel 714, and configured to engage the drive wheel 714 to induce a rotation thereof.

In one embodiment, the ratchet wheel 712 is moveable in a direction parallel to the axis 718 (FIG. 47B) for moving toward the drive wheel 714 to engage the drive wheel 714 and for moving away from the drive wheel 714 to disengage therefrom (see FIGS. 50A and 50B), allowing free rotation of the drive wheel 714. In one aspect, the drive wheel 714 includes a first surface 720 (FIG. 47B) and a second surface 722 (FIG. 47B). As illustrated in FIG. 48A, the second surface 722 includes a plurality of circumferentially spaced teeth 724, which may be evenly spaced.

Furthermore, as illustrated in FIG. 49, the drive wheel 714 includes a plurality of circumferentially spaced driven teeth 726, which may be evenly spaced, and are configured to be engageable by the plurality of teeth 724 on the second surface 722 of the ratchet wheel 712.

In addition, the first surface 720 of the ratchet wheel 712 includes at least one variable contour 728 having a first end 730 and a second end 732. As illustrated in FIG. 48B, the drive mechanism 710 includes at least one protrusion 734 projecting from a portion of the recess 711 toward the first surface 720 of the ratchet wheel 712. In the illustrated embodiment, as shown in FIG. 49, the contoured surface 728 includes a plurality of ramps 736 having the first and second ends 730, 732, which are defined by first and second stop members 738, 740, and the drive mechanism 710 includes a plurality of protrusions 734 (FIG. 48B). The protrusions 734 are positioned toward the first stop member 738 before the drive mechanism 710 is actuated, and configured to travel along the variable contour of the ramps 736 toward the second stop member 732 upon actuation of the drive mechanism 710. An interaction between the protrusions 734 and the variable contour of the ramp 736 moves the ratchet wheel 712 toward the drive wheel 714 to facilitate engagement of the plurality of teeth 724 of the ratchet wheel 712 to the plurality of driven teeth 726 of the drive wheel 714, rotating the drive wheel 714 and drive shaft 716 (FIG. 46B).

Figure 45:
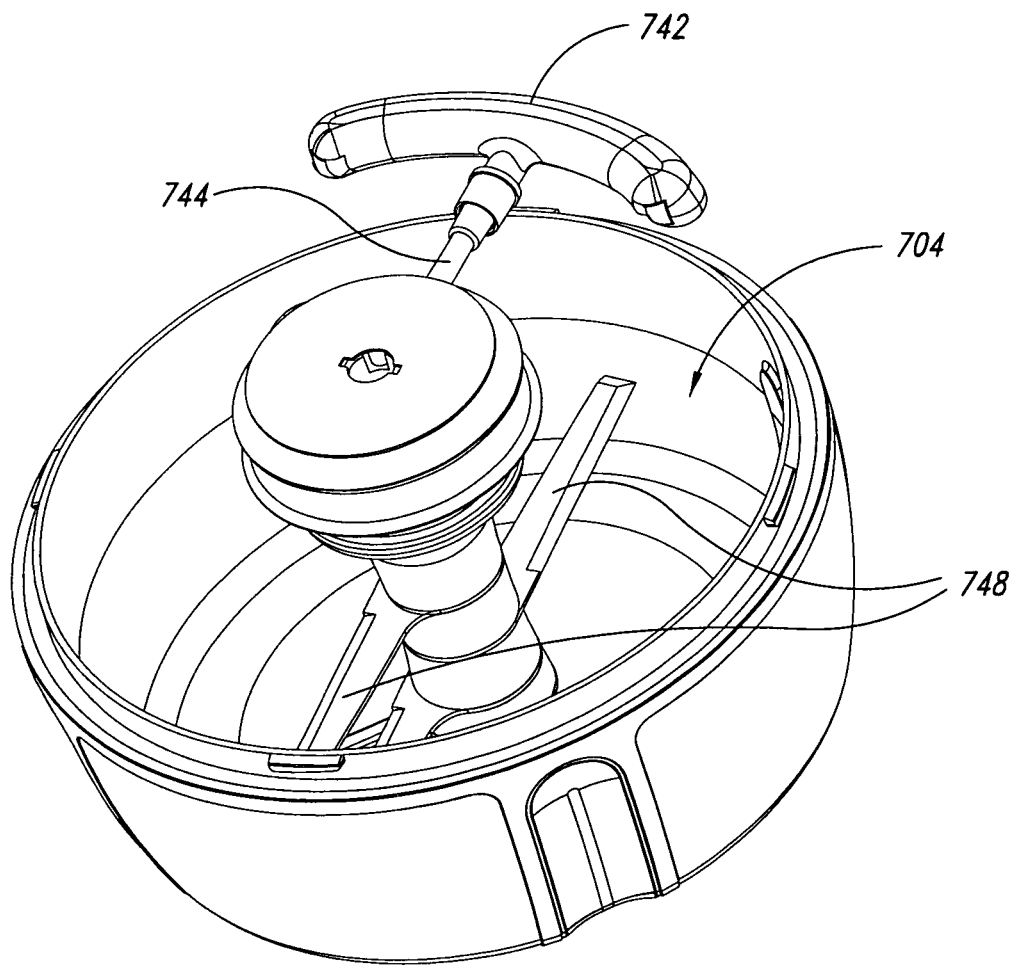
FIG. 45 is an isometric view of a portion of the processing system of FIG. 44.
Figure 46:
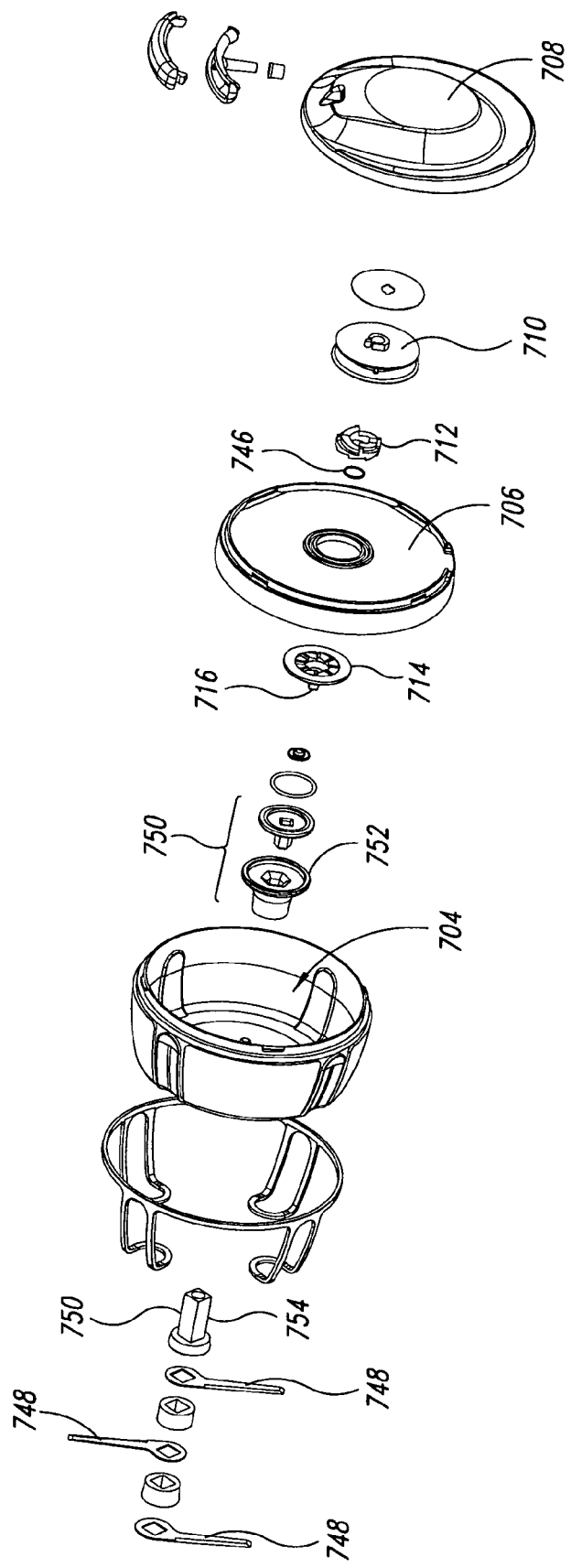
FIG. 46 is an isometric exploded view of the processing system of FIG. 44.

As illustrated in FIG. 45, in one embodiment, the system 700 may include an actuating member 742, which in one aspect can be a pull member attached to a cable 744. In this aspect, the drive mechanism 710 can include a pulley member having a groove formed about a circumference thereof and configured to receive the cable 744. When a user pulls on the pull member, the cable 744 rotates or actuates the pulley member for biasing the ratchet wheel 712 toward the drive wheel 714 as discussed above. As illustrated in the exploded view of FIG. 46, the drive mechanism 710 and ratchet wheel 712 can be positioned between the cover 708 and the lid 706, so that the drive mechanism 710 and ratchet wheel 712 are not exposed to the food item. In such an embodiment, and as illustrated in FIG. 46, the lid 706 can include an opening for allowing mechanical communication between the ratchet and drive wheels 714, 716.

In addition, or instead, in another aspect, the actuating member 742 can include a motor, such as an electric motor, in electrical communication with the drive mechanism 710 and configured to rotate the drive mechanism 710 for rotating and biasing the ratchet wheel 712 toward the drive wheel 714 as discussed above.

Figure 50A:
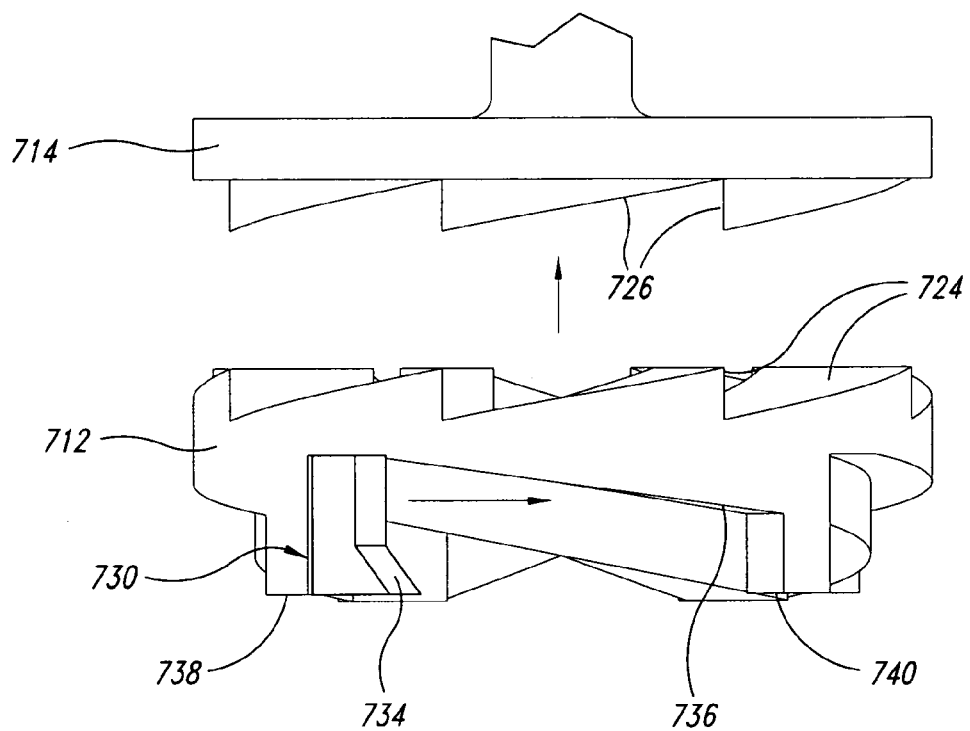
FIG. 50A is a side view of a portion of the processing system of FIG. 44, shown in a disengaged position.
Figure 50B:
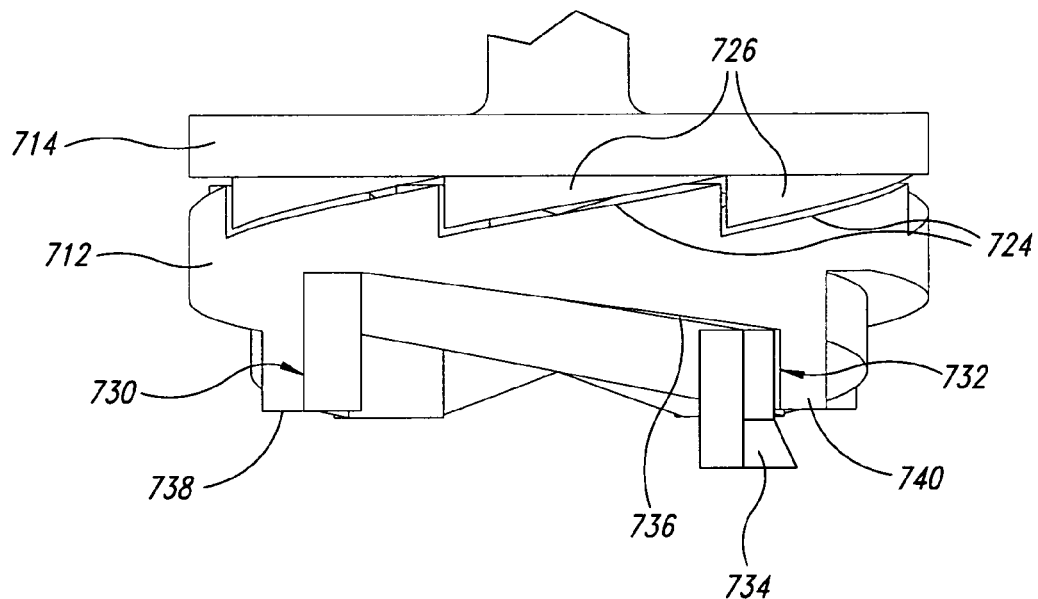
FIG. 50B is the side view of the processing system of FIG. 50A, shown in an engaged position.

FIGS. 50A and 50B illustrate only the protrusion 734 of the drive mechanism 710 along with the ratchet wheel 712 and drive wheel 714 for clarity of illustration and description. As illustrated in FIG. 50A, before actuation of the drive mechanism 710, the ratchet wheel 712 is spaced from the drive ratchet 714 in a disengaged position. Upon actuation, the plurality of teeth 724 of the ratchet wheel 712 engages the plurality of driven teeth 726 of the drive wheel 714, respectively, as discussed above to be in an engaged position. Further, the protrusion 734 travels the length of the ramp 736, and ceases motion upon confronting the second stop member 740 toward the second end 732 of the ramp 736 as shown in FIG. 50B, for facilitating movement of the ratchet wheel 712 toward the drive wheel 714 and engagement of their respective plurality of teeth 724, 726.

By the time the drive mechanism 710 and the protrusion 734 cease motion, the ratchet wheel 712 has imparted rotational motion to the drive wheel 714, and the ratchet and drive wheels 712, 714 continue rotating. Since the ratchet wheel 712 rotates with respect to the drive mechanism 710 after the drive mechanism 710 has ceased motion, the protrusion 734 gets positioned in its starting position toward the first end 730 of the ramp 736, as shown in FIG. 50A. The first stop member 738 blocks and ceases motion of the ratchet wheel 712 upon confronting the protrusion 734; however, the drive wheel 714 continues to rotate due to built momentum. Since the protrusion 734 is back in its position toward the first end 730, the ratchet wheel 712 recedes back toward the disengaged position, allowing the drive wheel 714, and therefore, the drive shaft 716 (FIG. 47B) to continue rotating, for processing the food item as will be described below.

The ratchet wheel 712 can recede in any suitable manner, including but not limited to, being biased back by the driven teeth 726 of the drive wheel 714, as the driven teeth 726 of the drive wheel 714 cam passed the plurality of teeth 724 of the ratchet wheel 712. In addition, or instead, the ratchet wheel 712 can recede by being biased toward the recess 711 via gravity depending on an orientation of the system 700. In addition, or instead, a biasing member 746 (FIG. 46), such as a washer spring can be positioned between the ratchet and drive wheels 712, 714, such as toward an inner diameter thereof, to facilitate recession of the ratchet wheel 712 and free rotation of the drive wheel 714. Other recession configurations are possible and contemplated to be within the scope of this disclosure and the claims that follow. In some embodiments, the first surface 720 of the ratchet wheel may include guiding ramps 737 (FIG. 49), extending substantially adjacent the ramps 736, to provide at least one guiding wall toward a side of the respective protrusions 734 (FIG. 48B), further facilitating stability and guiding of the protrusions 734 as they travel along the ramps 736.

As illustrated in FIGS. 45 and 46, the system 700 further includes at least one food processing arm 748 drivably coupled to the drive shaft 716 to rotate upon rotation of the drive shaft 716. Further, a leverage mechanism 750 such as a bolt add-on 752 and/or an extension shaft 754 may couple the drive shaft 716 to the food processing arm 748 for more efficient and stronger rotation of the food processing arm 748. In the illustrated embodiment, the system 700 includes more than one food processing arms 748, which may include blades, blending structures, elastomeric dull surfaces for peeling for example garlic skin by beating its outer surface, or any other suitable food processing arm. Furthermore in one embodiment, the components of the system 700 are removable from each other for easy cleaning or for replacing parts or switching between different types of food processing arms 748.

One of ordinary skill in the art will appreciate that the drive mechanism, ratchet wheel, and drive wheel configuration described in conjunction with the embodiments shown in FIGS. 44 through 50B can be incorporated in the all the other embodiments discussed herein, for example in addition to, or instead of, the sliding member discussed above in conjunction with other embodiments. For example, the processing system of FIGS. 1-3 may utilize the drive mechanism, ratchet wheel, and drive wheel to facilitate free rotation of the inner container.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A hand-held system configured to facilitate processing of a food item, the system comprising:
   a cup and a lid removably mounted with respect to the cup, wherein the cup and lid define at least a portion of a chamber configured to receive the food item;
   an actuator selectively coupled to a drive shaft, the drive shaft extending in the chamber along a first axis, the actuator including at least one protrusion from the bottom surface of the actuator;
   a food processing arm removably and drivingly engaged to the drive shaft, rotation of the drive shaft rotating the food processing arm;
   a drive wheel coupled to the drive shaft and having a plurality of circumferentially driven teeth; and
   a ratchet wheel positioned between the actuator and the drive wheel, the ratchet wheel being moveable along the first axis between an engaged position and a disengaged position, and having a first surface and a second surface, opposed to the first surface, the first surface having a variable contour extending continuously between a first end defined by a first stop member and a second end defined by a second stop member, the first and second stop members each protruding from the variable contours towards the actuator, the second surface having a plurality of circumferentially spaced teeth,
   wherein the ratchet wheel is positioned such that, in both the engaged and disengaged positions, the first surface faced the bottom surface of the actuator, the second surface faces the plurality of circumferentially driven teeth of the drive wheel, and the bottom surface of the protrusion contacts the variable contour, and
   wherein the ratchet wheel is positioned such that, in the disengaged position the protrusion is positioned toward the first end of the variable contour and the ratchet wheel is spaced from the drive wheel, and, in the engaged position, the protrusion abuts the second stop member at the second end of the variable contour and the plurality of spaced teeth of the ratchet wheel engage the plurality of driven teeth of the drive wheel, respectively, to rotate the drive wheel and drive shaft.

2. The hand-held system of claim 1, wherein the drive mechanism and ratchet wheel are positioned outside the chamber such that the drive mechanism and ratchet wheel are not exposed to the food item.

3. The hand-held system of claim 2, further comprising:
   a cover removably mounted with respect to the cup and the lid, the drive mechanism and the ratchet wheel being positioned between the cover and the lid.

4. The hand-held system of claim 1 wherein the drive mechanism includes a recess, the ratchet wheel being at least partially positioned in the recess.

5. The hand-held system of claim 1 wherein the actuator includes at least one of a pulley system and an electric motor.

6. The hand-held system of claim 1 wherein the actuator includes a pulley system having a cable and a pull member and the drive mechanism includes a spool having a groove configured to receive the cable wherein manipulating the pull member rotates the drive mechanism.

7. The drive system of claim 1 wherein the variable contour includes a plurality of circumferentially spaced ramps, each having first and second ends, the drive mechanism includes a plurality of circumferentially spaced protrusions, each configured to travel along a corresponding ramp of the plurality of ramps, the plurality of first end and second ends being respectively defined by first and second stop members, wherein, prior to actuation each protrusion is positioned toward the first stop member of the corresponding ramp, during actuation the protrusions travel along the corresponding ramps, respectively, to move the ratchet wheel toward the engaged position.

8. A drive system comprising:
   an actuator selectively coupled to a drive shaft extending along a first axis and configured to be coupled to a processing component of a food processing system having a chamber for holding a food item and a lid removably mounted with respect to the chamber, the actuator including at least one protrusion from a bottom surface of the actuator;
   a drive wheel coupled to the drive shaft and having a plurality of circumferentially driven teeth; and
   a ratchet wheel positioned between the actuator and the drive wheel, the ratchet wheel being moveable along the first axis between an engaged position and a disengaged position, and having a first surface and a second surface, opposed to the first surface, the first surface having a variable contour extending continuously between a first end defined by a first stop member and a second end defined by a second stop member, the first and second stop members each protruding from the variable contours towards the actuator, the second surface having a plurality of circumferentially spaced teeth,
   wherein the ratchet wheel is positioned such that, in both the engaged and disengaged positions, the first surface faces the bottom surface of the actuator, the second surface faces the plurality of circumferentially driven teeth of the drive wheel, and a bottom surface of the protrusion contacts the variable contour, and
   wherein the ratchet wheel is positioned such that, in the disengaged position the protrusion is positioned toward the first end of the variable contour and the ratchet wheel is spaced from the drive wheel, and in the engaged position, the protrusion abuts the second stop member at the second end of the variable contour and the plurality of spaced teeth of the ratchet wheel engage the plurality of driven teeth of the drive wheel, respectively, to rotate the drive wheel and drive shaft.

9. The drive system of claim 8 wherein the variable contour includes a plurality of circumferentially spaced ramps, each having first and second ends, the drive mechanism includes a plurality of circumferentially spaced protrusions, each configured to travel along a corresponding ramp of the plurality of spaced ramps, the plurality of first end and second ends being respectively defined by first and second stop members, wherein, prior to actuation each protrusion is positioned toward the first stop member of the corresponding ramp, during actuation the protrusions travel along the corresponding ramps, respectively, to move the ratchet wheel toward the engaged position.

10. The drive system of claim 9, further comprising:
a plurality of guiding ramps adjacent the plurality of spaced ramps and including at least one guiding wall to facilitate guiding the plurality of protrusions along the plurality of spaced ramps.

11. The drive system of claim 8 wherein the actuating mechanism includes at least one of a pulley system and an electric motor.

12. The drive system of claim 8 wherein the actuating mechanism includes a cable and a pull member and the drive mechanism includes a spool having a groove configured to receive the cable wherein manipulating the pull member rotates the drive mechanism.

13. A drive system configured to impart rotational motion to a processing component of a food processing system and facilitate free rotation thereof, the food processing system having a chamber for holding a food item to be processed and a lid configured to cover the chamber, the drive system comprising:
an actuator selectively coupled to a drive shaft extending along a first axis and configured to be coupled to the processing component, the actuator including at least one protrusion from a bottom surface of the actuator;
a drive wheel coupled to the drive shaft and having a plurality of circumferentially driven teeth; and
a ratchet wheel positioned between the actuator and the drive wheel, the ratchet wheel being moveable in a direction substantially parallel to the first axis between an engaged position and a disengaged position, and having a first surface and a second surface, opposed to the first surface, the first surface having a variable contour extending continuously between a first end defined by a first stop member and a second end defined by a second stop member, the first and second stop members each protruding from the variable contours towards the actuator, the second surface having a plurality of circumferentially spaced teeth, wherein the ratchet wheel is positioned such that, in both the engaged and disengaged positions, the first surface faces the bottom surface of the actuator, the second surface faces the plurality of circumferentially driven teeth of the drive wheel, and a bottom surface of the protrusion contacts the variable contour, and wherein the ratchet wheel is positioned such that, an interaction between the contoured surface of the ratchet wheel and the protrusion of the drive mechanism rotates the ratchet wheel and moves the ratchet wheel toward the engaged position to facilitate engaging the plurality of teeth to the plurality of driven teeth to impart rotational motion to the drive wheel.

14. The hand-held system of claim 1 wherein the drive wheel is located at least partially within the chamber between the cup and the lid, and the drive wheel and ratchet wheel mechanically communicate through an opening in the lid.

15. The drive system of claim 8 wherein the drive wheel is configured to be located at least partially within the chamber between the cup, and the lid and the drive wheel and ratchet wheel mechanically communicate with each other through an opening in the lid.

16. The drive system of claim 13 wherein the drive wheel is configured to be located at least partially within the chamber between the cup and the lid, and the drive wheel and ratchet wheel mechanically communicate with each other through an opening in the lid.

* * * * *